United States Patent [19]
Alvarez, III et al.

[11] 4,330,857
[45] May 18, 1982

[54] DYNAMICALLY VARIABLE PRIORITY, VARIABLE POSITION CHANNELS IN A TDMA BURST

[75] Inventors: Joseph A. Alvarez, III, Damascus; Joseph M. Bensadon, Germantown; John F. Brennen, Gaithersburg; Robert W. Krug, Rockville, all of Md.

[73] Assignee: IBM Corporation, Armonk, N.Y.

[21] Appl. No.: 126,076

[22] Filed: Feb. 29, 1980

[51] Int. Cl.³ ............................................. H04J 7/12
[52] U.S. Cl. ................................. 370/104; 455/12
[58] Field of Search ................. 370/104, 58, 60, 61, 370/93, 94, 77, 79; 455/12

[56] References Cited

U.S. PATENT DOCUMENTS

| 4,009,343 | 2/1977 | Markey | 370/104 |
| 4,208,740 | 6/1980 | Yin | 370/7 |

Primary Examiner—Howard Britton
Attorney, Agent, or Firm—John E. Hoel

[57] ABSTRACT

The position of a channel of information transmitted from a particular port is varied in response to the changing priority of that port's messages as time passes. Variable priority assignments become necessary when low speed data has been deferred in its transmission until a time just prior to the production of a second unit of data. The effect of changing the priority of deferred data messages in a TDMA burst is to change the relative position of the associated channel within the TDMA burst by means of compiling the address of that message in a higher priority threaded list. The mechanism by which a deferred data message has its priority changed from an initial low value to a subsequent higher value is by measuring the amount of time remaining for retaining a deferred data message relative to the expected time of arrival of the next data message, the impending arrival of a new message causing the priority of the deferred message to be increased, thereby increasing the probability of its successful transmission.

8 Claims, 28 Drawing Figures

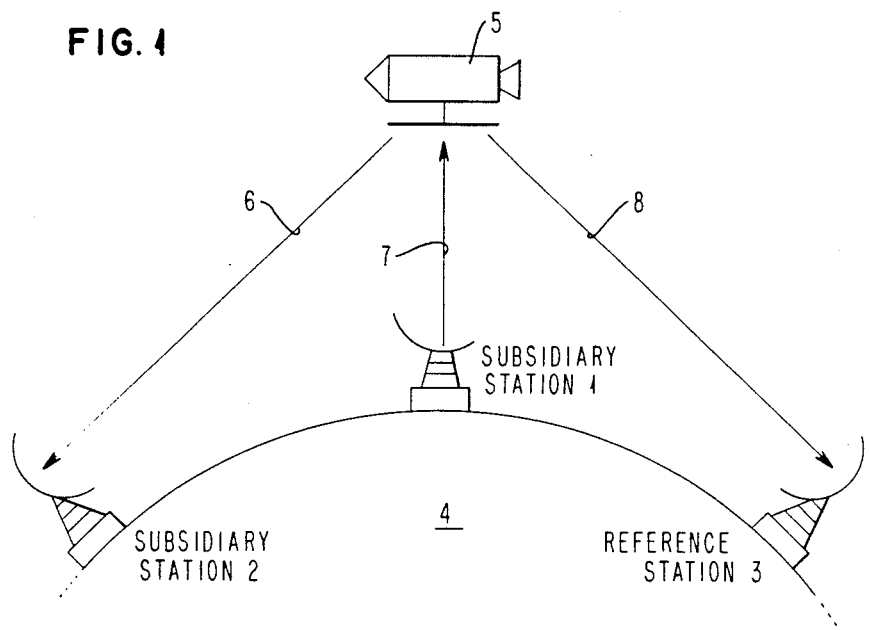
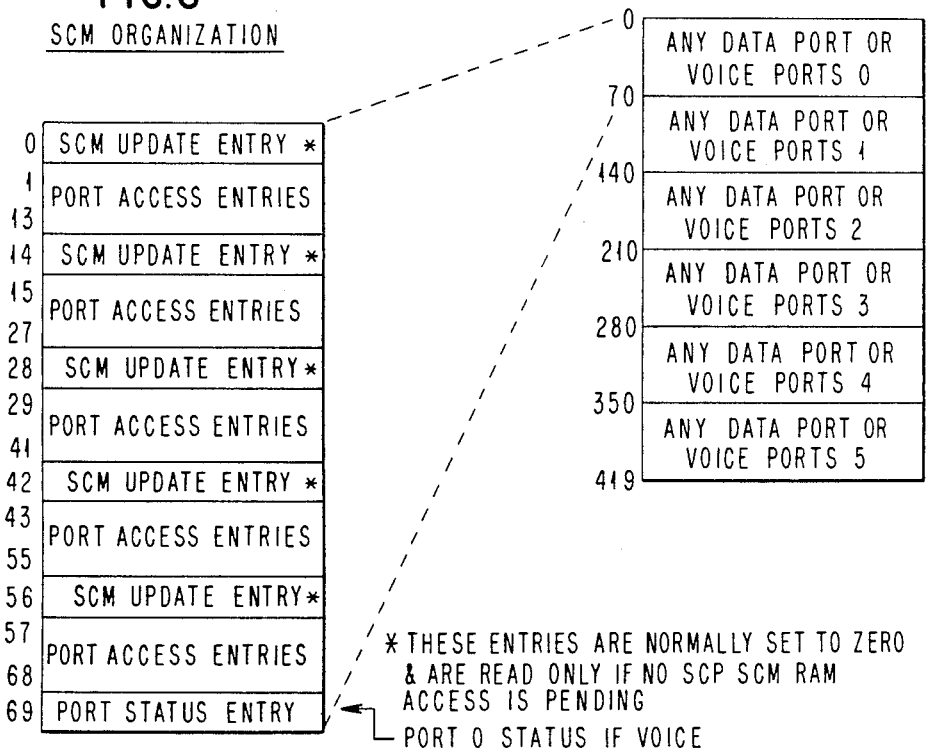

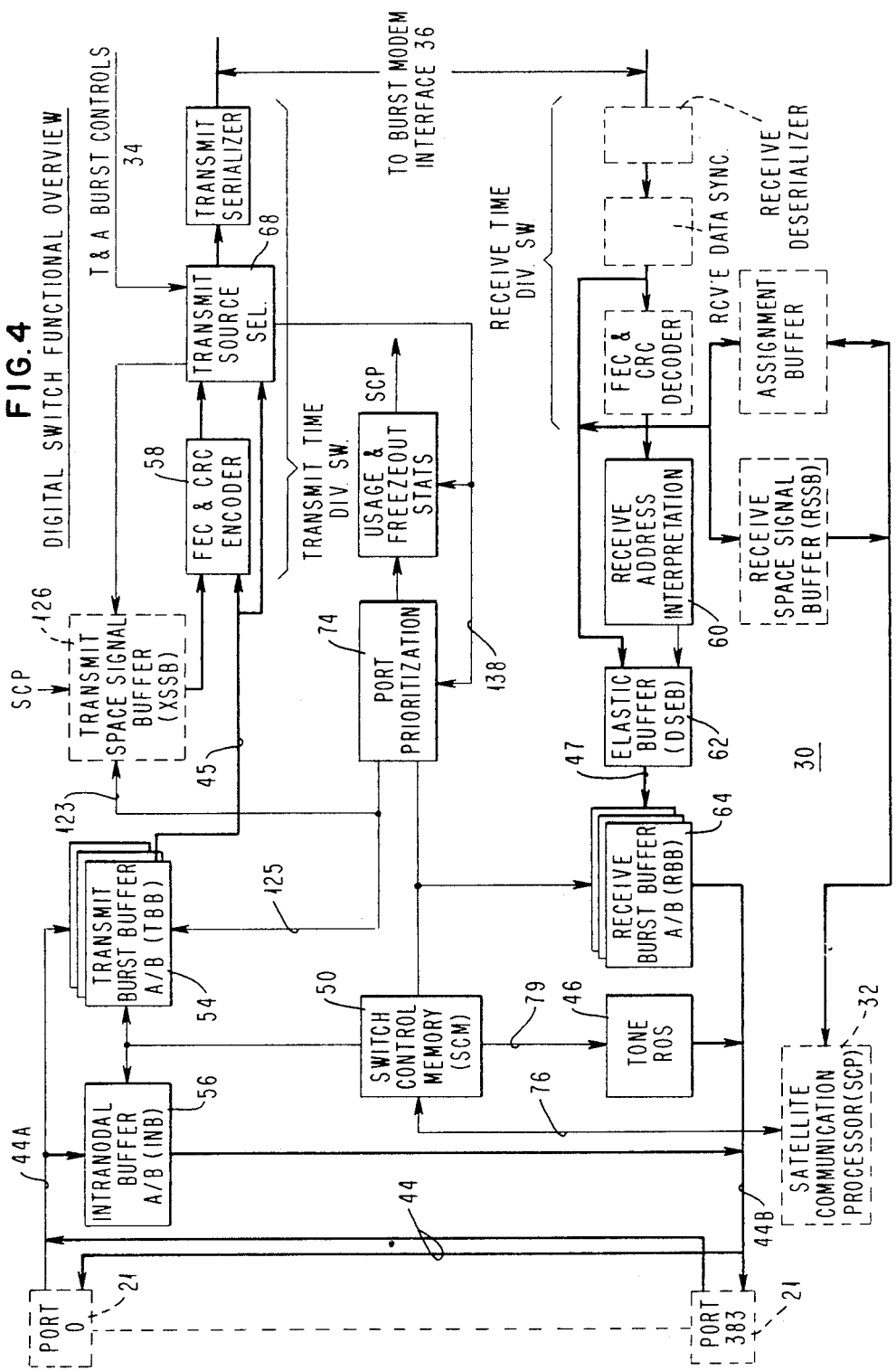
FIG. 4 DIGITAL SWITCH FUNCTIONAL OVERVIEW

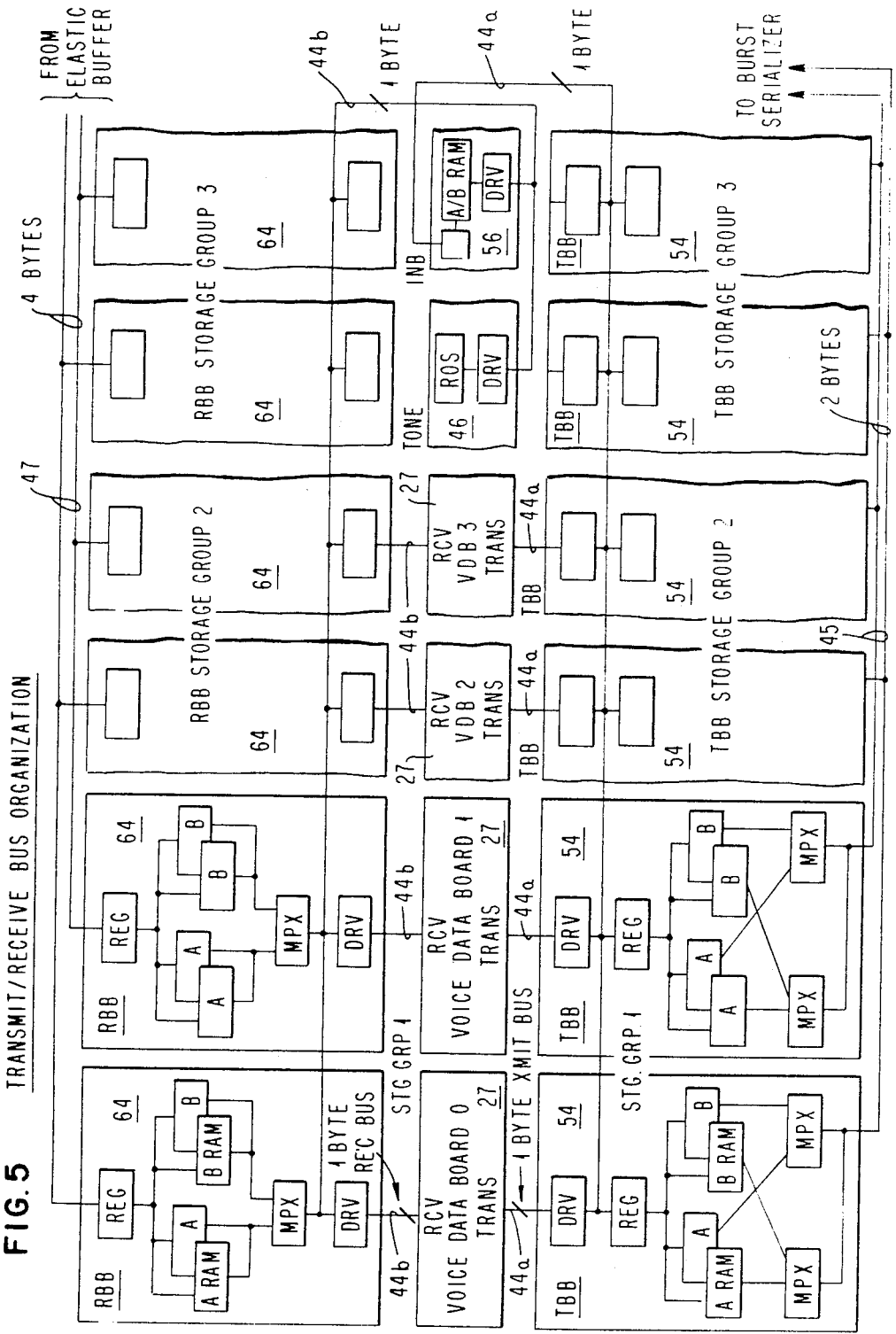
FIG. 5 TRANSMIT/RECEIVE BUS ORGANIZATION

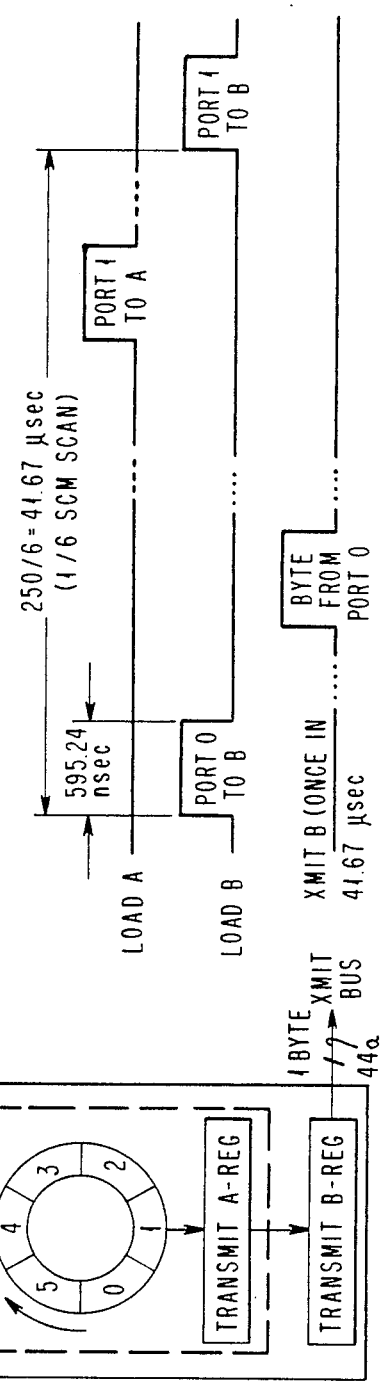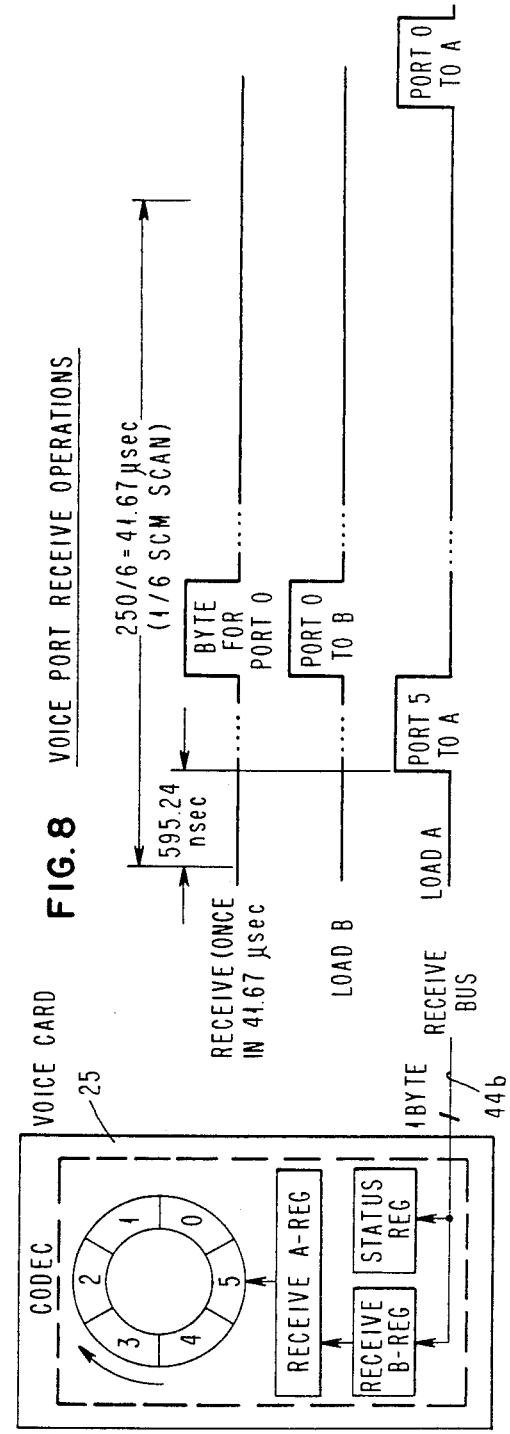

PORT OPERATING POINT TO POINT VIA SATELLITE

PORT CHANNELS SENT (ASSUMING NO DAC) FOR 56 Kbps PORT

PORTS X & Y COMMUNICATING INTRANODALLY

OPERATION ON EVEN SCM SCANS — INB LOADED ARRAY

PORTS X & Y COMMUNICATING INTRANODALLY

OPERATION ON ODD SCM SCANS

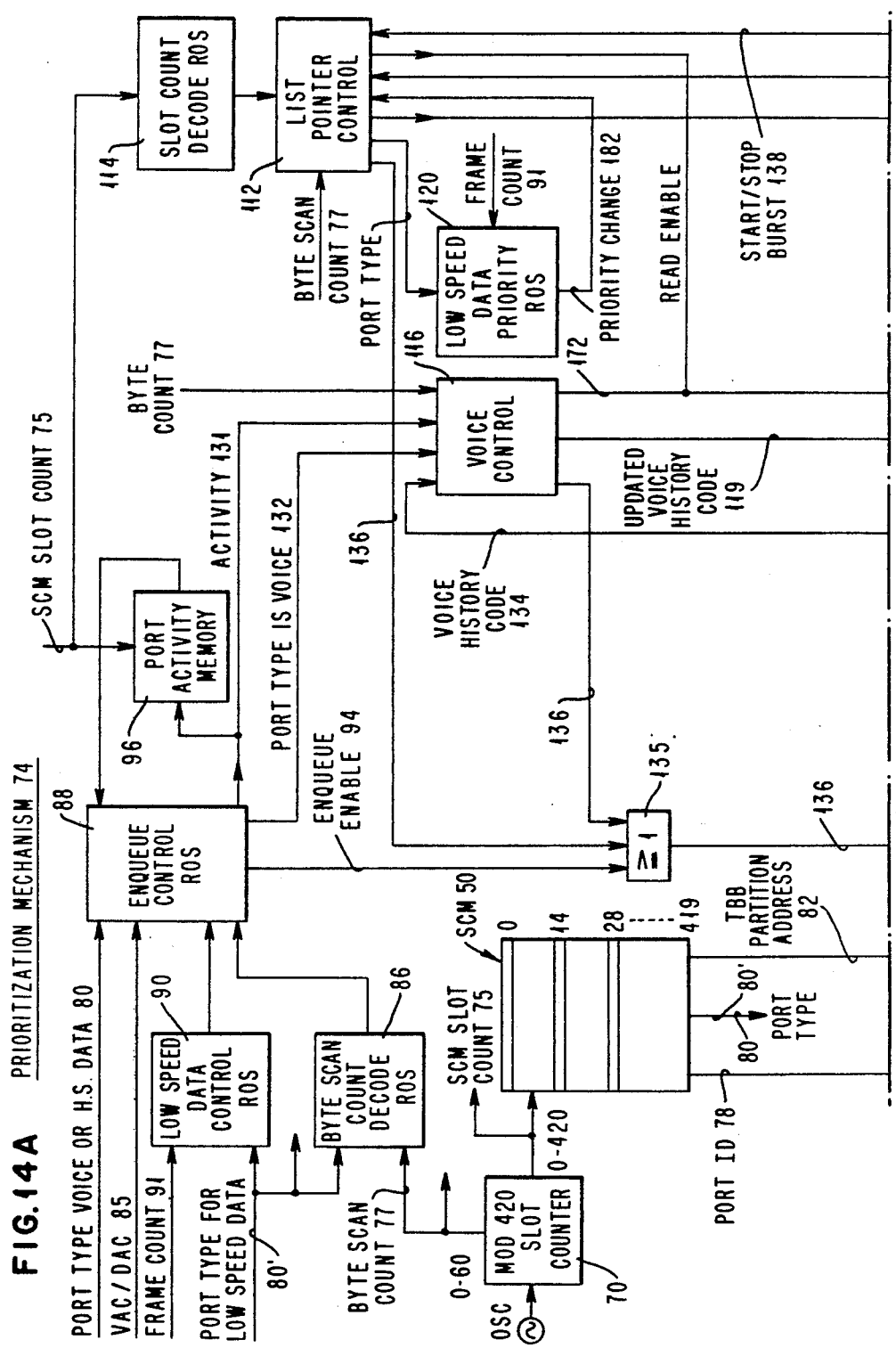
FIG. 14A PRIORITIZATION MECHANISM 74

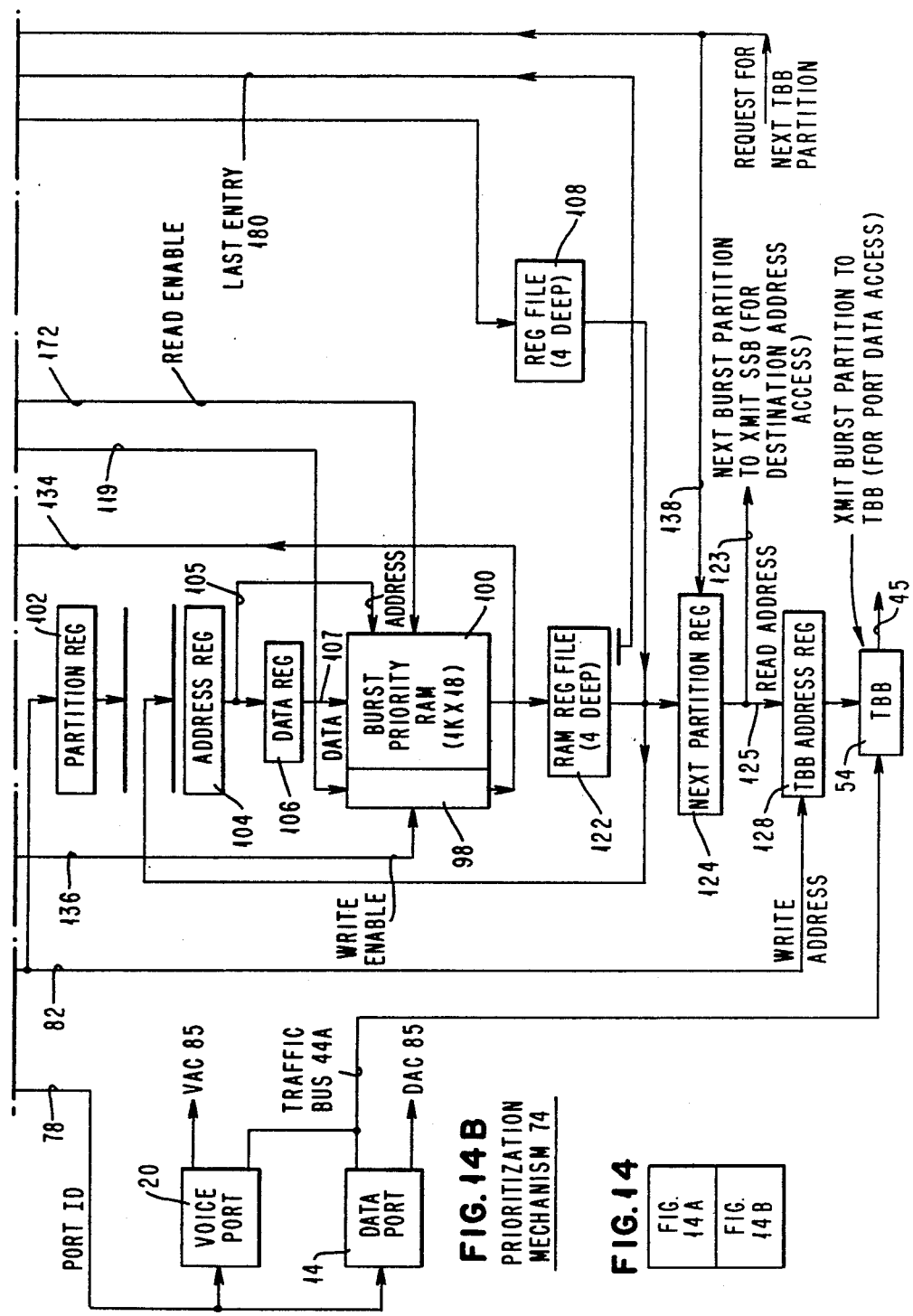

FIG. 15  BURST PRIORITY RAM 100
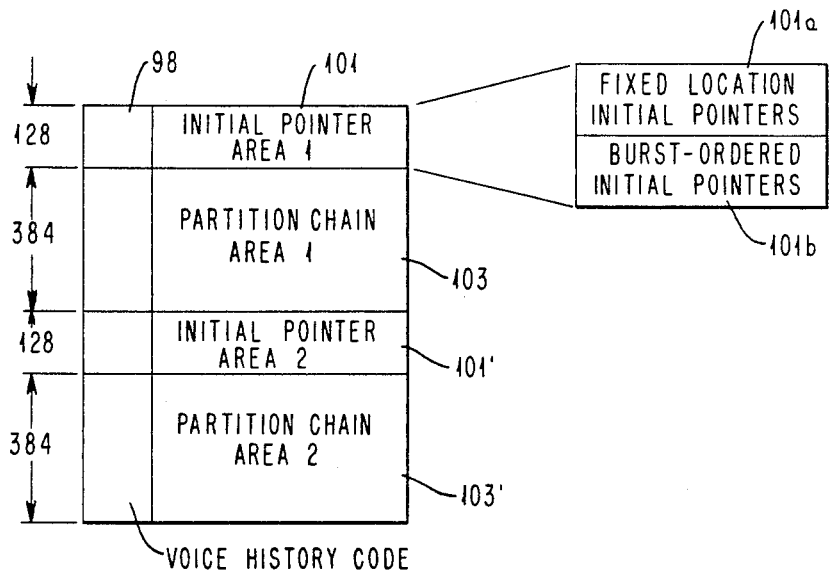
FIG. 16  TRANSMIT LIST STRUCTURE IN BURST PRIORITY RAM
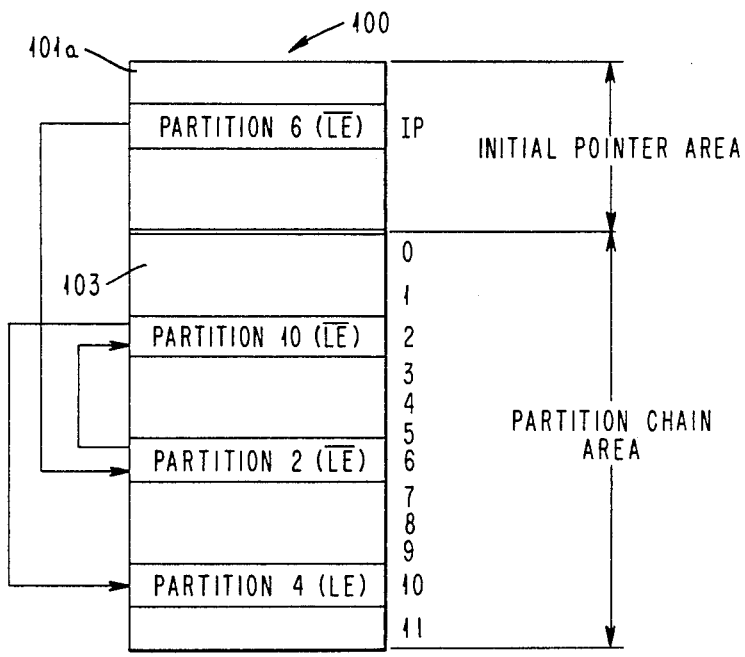

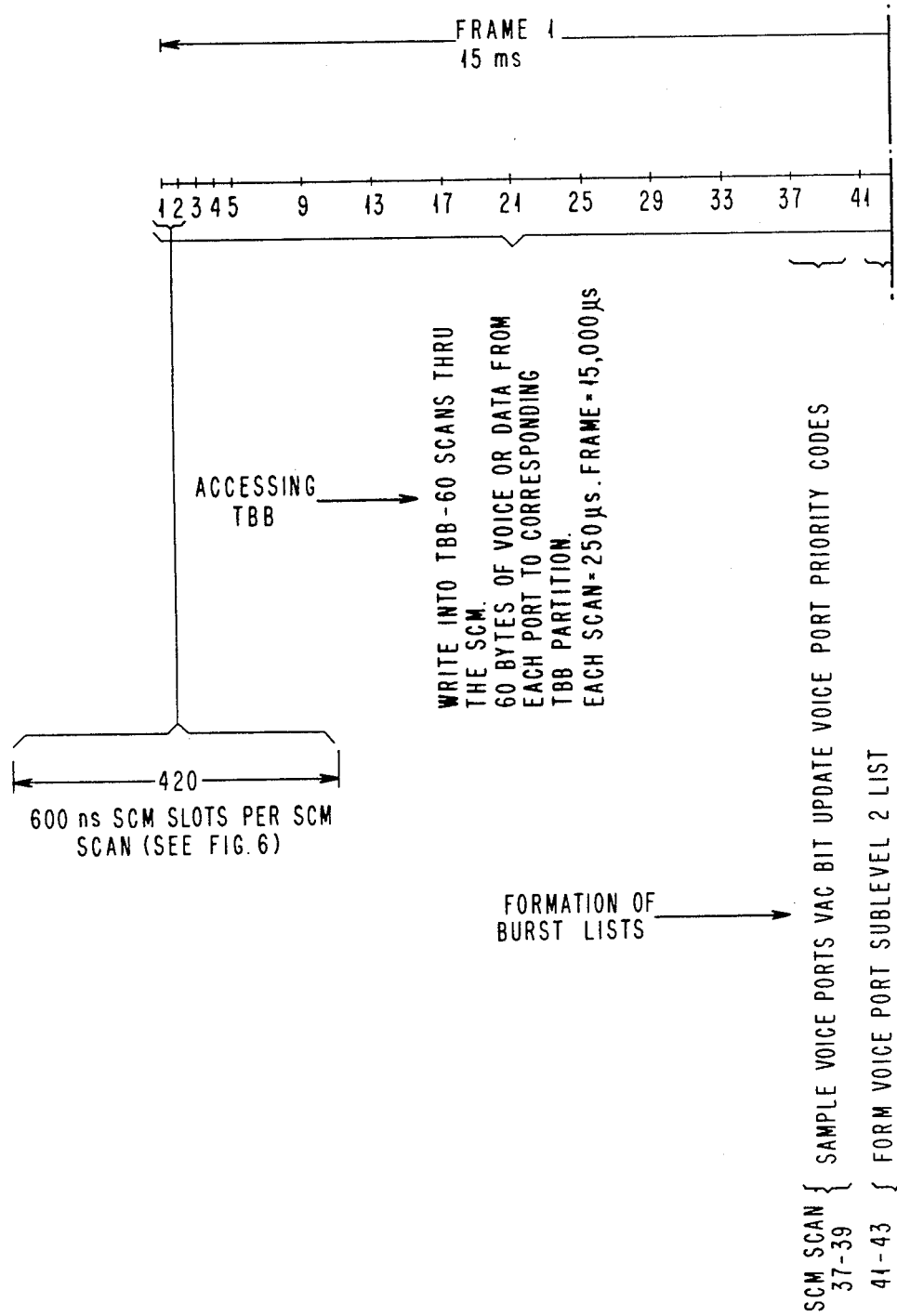
FIG.17A TIMING DIAGRAM FOR BURST LIST FORMATION & TRANSMISSION

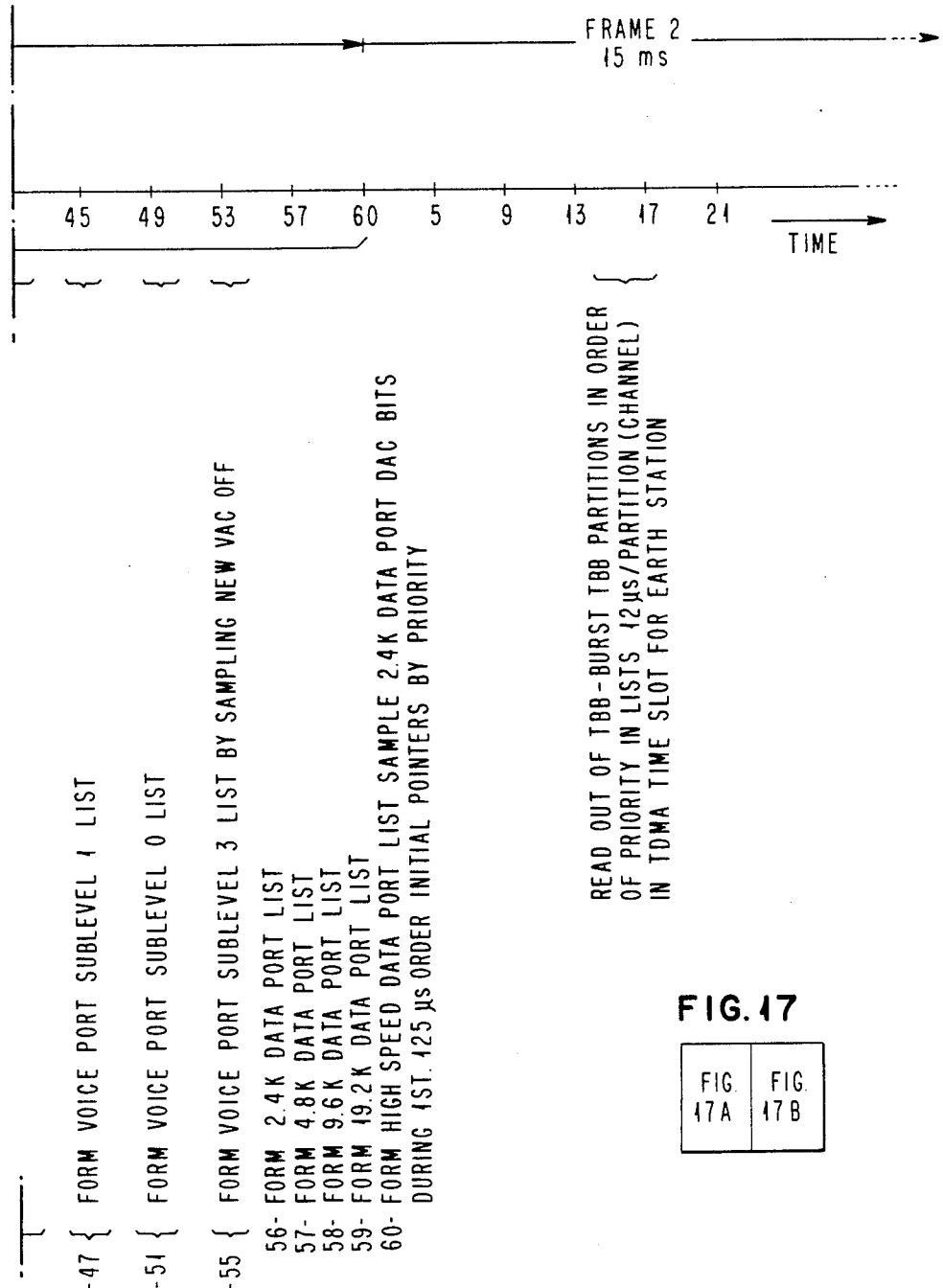
FIG.17B TIMING DIAGRAM FOR BURST LIST FORMATION & TRANSMISSION
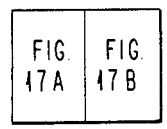
FIG.17
| FIG. 17A | FIG. 17B |

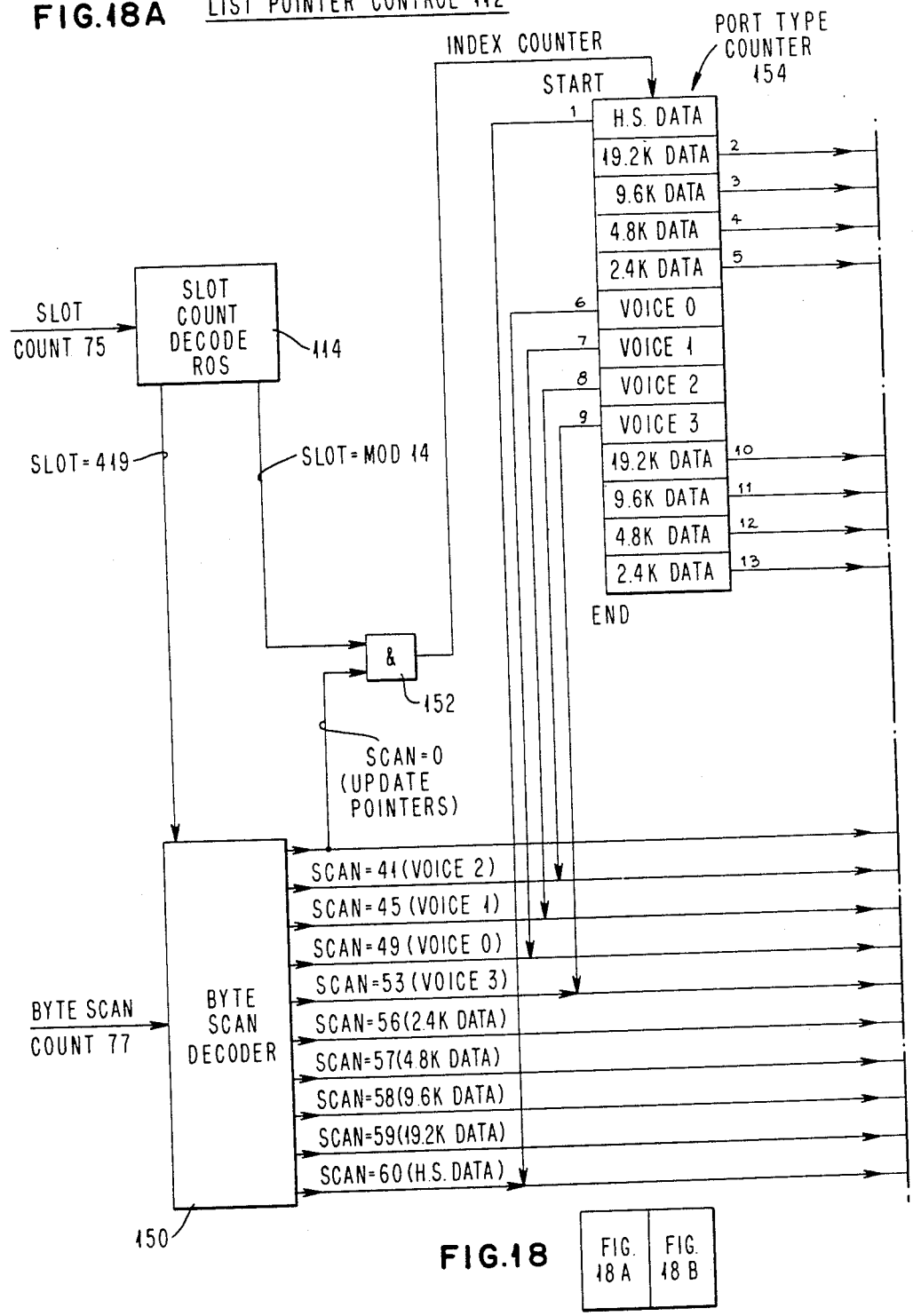
FIG.18A  LIST POINTER CONTROL 112
FIG.18 | FIG. 18A | FIG. 18B

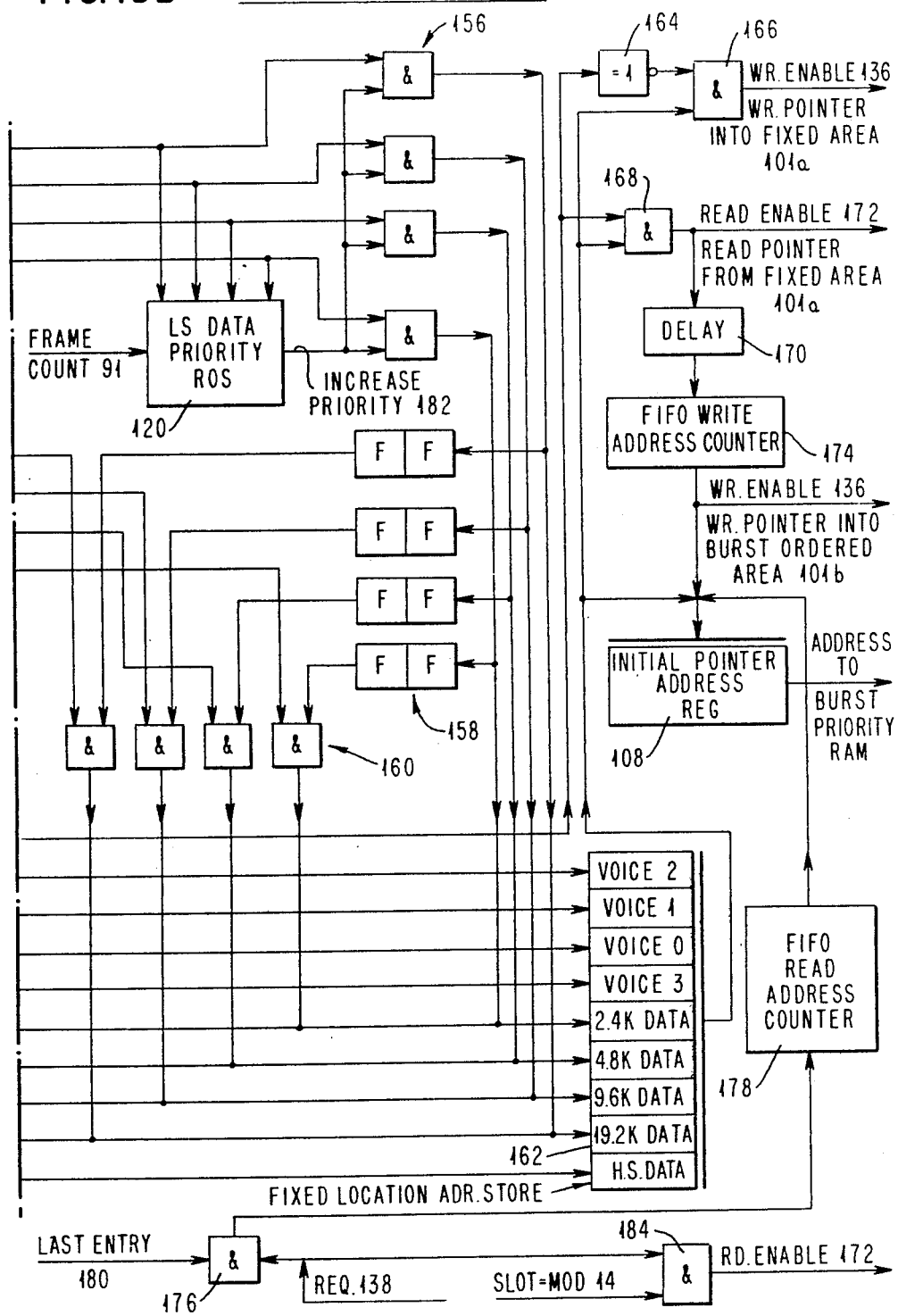
FIG. 18B   LIST POINTER CONTROL 112

FIG. 19

FIXED LOCATION
INITIAL POINTER
AREA 101a

| $V_2$ | $V_1$ | $V_0$ | $V_3$ | $D_{2.4}$ | $D_{4.8}$ | $D_{9.6}$ | $D_{19.2}$ | $D_{HS}$ |

FRAME NUMBER
(SEE TABLE III)

BURST-ORDERED INITIAL POINTER AREA 101b

| $D_{HS}$ | $\overline{D_{19.2}}$ | $\overline{D_{9.6}}$ | $\overline{D_{4.8}}$ | $\overline{D_{2.4}}$ | $V_0$ | $V_1$ | $V_2$ | $V_3$ | 0 |
| $D_{HS}$ | $V_0$ | $V_1$ | $V_2$ | $V_3$ | $D_{19.2}$ | $D_{9.6}$ | $D_{4.8}$ | $D_{2.4}$ | 1 |
| $D_{HS}$ | $\overline{D_{19.2}}$ | $V_0$ | $V_1$ | $V_2$ | $V_3$ | $D_{9.6}$ | $D_{4.8}$ | $D_{2.4}$ | 2 |
| $D_{HS}$ | $\overline{D_{19.2}}$ | $\overline{D_{9.6}}$ | $V_0$ | $V_1$ | $V_2$ | $V_3$ | $D_{4.8}$ | $D_{2.4}$ | 4 |
| $D_{HS}$ | $\overline{D_{9.6}}$ | $\overline{D_{4.8}}$ | $V_0$ | $V_1$ | $V_2$ | $V_3$ | $D_{19.2}$ | $D_{2.4}$ | 7 |
| $D_{HS}$ | $\overline{D_{19.2}}$ | $\overline{D_{9.6}}$ | $\overline{D_{4.8}}$ | $\overline{D_{2.4}}$ | $V_0$ | $V_1$ | $V_2$ | $V_3$ | 14 |

FIRST　　　　　　　　　　　　　　　　　　　　LAST

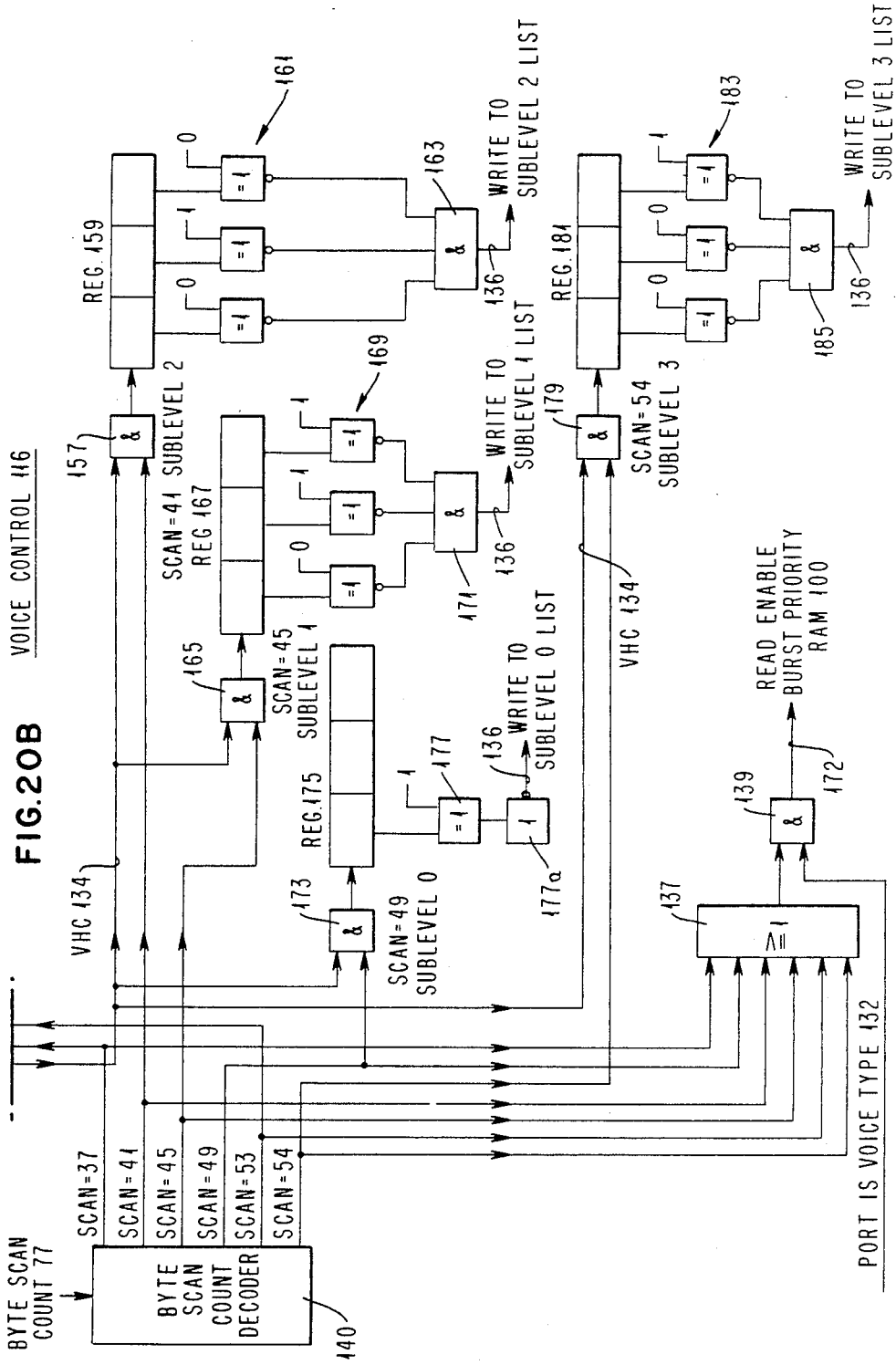

DYNAMICALLY VARIABLE PRIORITY, VARIABLE POSITION CHANNELS IN A TDMA BURST

CROSS-REFERENCE TO RELATED APPLICATIONS

U.S. patent application Ser. No. 971,587, by R. J. Hallett, et al., entitled "Logarithmic Companded Delta Modulation System," filed Dec. 20, 1978.

U.S. patent application Ser. No. 79,928, by J. W. Fennel, Jr. et al., entitled "Demand Assignment Technique for Distribution of Bandwidth in a TDMA Satellite Communications System," filed Sept. 28, 1979.

U.S. patent application Ser. No. 85,555, by J. W. Fennel, Jr., et al., entitled "Baton Passing Method and Apparatus for Maintaining Synchronization in a TDMA Satellite Communications System," filed Oct. 19, 1979.

U.S. patent application Ser. No. 126,080, by J. A. Alvarez, et al., entitled "Priority Threaded Message Burst Mechanism for a TDMA Communication," filed Feb. 29, 1980.

U.S. patent application Ser. No. 128,321, by J. A. Alvarez, et al., entitled "Mechanism for Synchronization of Data Ports in TDMA Communication," filed Mar. 7, 1980.

U.S. patent application Ser. No. 132,708, by J. A. Alvarez, et al., entitled "Initial Acquisition of Synchronization for a Station in a TDMA Satellite Communication Network," filed Mar. 21, 1980.

U.S. patent application Ser. No. 128,058, by L. C. Queen, entitled "Byte Data Activity Compression," filed Mar. 7, 1980.

U.S. patent application Ser. No. 128,057, by N. F. Brickman, et al., entitled "Multiple Data Rate Testing of Communication Equipment," filed Mar. 7, 1980.

U.S. patent application Ser. No. 130,498, by J. A. Alvarez, et al., entitled "Time Domain Multiple Access Broadcasting, Multipoint, and Conferencing Communication Apparatus and Method," filed Mar. 14, 1980.

U.S. patent application Ser. No. 128,322, by J. A. Alvarez, et al., entitled "Multiple Data Rate Digital Switch for a TDMA Communications Controller," filed Mar. 7, 1980.

U.S. patent application Ser. No. 133,733, by N. F. Brickman, et al., entitled "A Call Processor for a Satellite Communications Controller," filed Mar. 25, 1980.

U.S. patent application Ser. No. 133,734, by N. F. Brickman, et al., entitled "Control Architecture for a Satellite Communications Controller," filed Mar. 25, 1980.

FIELD OF THE INVENTION

The invention disclosed broadly relates to telecommunications technology and more particularly relates to time domain multiple access communications.

BACKGROUND OF THE INVENTION

Conventional time domain multiple access (TDMA) satellite communication networks employ multiple radio stations which communicate through an earth satellite repeater by transmitting time-synchronized bursts of radio energy relative to the repeater and which receive a time multiplex composite of bursts containing corresponding modulated information from the repeater. In TDMA operations, multiple ground stations associated with radio signaling nodes transmit bursts of time-concentrated information signals on a shared carrier frequency spectrum and receive the same information signals after repetition by the satellite repeater on a shifted carrier frequency spectrum. Each ground station is assigned a particular time slot in a continuum of recurrent frames for transmission of its bursts and for the reception of its own bursts and the bursts of other stations. The bursts interleave at the satellite in close time formation without overlapping.

Each earth station includes connections to incoming digital lines and voice lines originating from terrestrial sources. These input lines are respectively connected to digital data ports and voice ports on a satellite communications controller (SCC) at the station. The SCC is a computer controlled satellite communications switching system which employs digital transmission techniques in a time division multiple access format. The TDMA format divides the time at the satellite into fixed length units called frames. Each earth station in a transponder is assigned a portion of the frame in which to transmit its traffic burst. Each traffic burst is received by all earth stations in the transponder. The amount of time assigned for each earth station's traffic burst may be different for each earth station and may also vary over time. A frame consists of a fixed time period allocated for transmission of network control and synchronization information and for transmission of traffic from the active earth stations in the network to one or more other earth stations in the network.

To make the most efficient use of the TDMA frame for a satellite communications network, the assignment of each local earth station's TDMA burst duration can be based on a statistical assessment of the demand by local voice and data ports, as is described in the copending U.S. patent application Ser. No. 79,928 filed Sept. 28, 1979 by J. W. Fennel, Jr., et al. entitled "Demand Assignment Technique for a TDMA Satellite Communication Network," assigned to the instant assignee. Occasionally the actual voice and data port demand at a local station exceeds that station's assigned burst duration so that some of the messages which are ready for transmission cannot be transmitted and may be frozen-out. For example, U.S. Pat. No. 4,009,343 to Markey, et al., discloses the storage of digitized message increments in a satellite communications controller, for a retransmission over a satellite link. If the input load from terrestrial sources to a local station exceeds the capacity of the traffic burst assigned to that station, part of the traffic load will be frozen-out. Traffic to be canceled is selected in a predetermined order of priority favoring data over voice activity and continuing voice talkspurt activity over initial talkspurt activity. However the disclosed system is limited to requiring that every port have a fixed virtual channel position in the TDMA burst. Only by the use of a voice activity compression (VAC) mask, can the actual transmission of a given channel be omitted when total channel activity has increased. What is needed is a more flexible means for ordering the priority of messages to be transmitted in a TDMA burst.

OBJECTS OF THE INVENTION

It is therefore an object of the invention to carry out time domain multiple access telecommunications in an improved manner.

It is another object of the invention to carry out the time domain multiple access communications by varying the order of priority of messages transmitted in the TDMA burst, in an improved manner.

It is yet a further object of the invention to carry out time domain multiple access communications by providing a mechanism to dynamically vary the priority of deferred data messages in accordance with the length of time of their deferral.

It is still a further object of the invention to carry out time domain multiple access communications by providing the mechanism to dynamically vary the priority of deferred data messages in the TDMA burst in accordance with the amount of time remaining for retaining a deferred data message relative to the expected time of arrival of the next data message.

SUMMARY OF THE INVENTION

These and other objects, features and advantages of the invention are accomplished by the dynamically variable priority/variable position mechanism disclosed herein. To avoid or minimize the effects of message freeze-out, the various types of messages are categorized into a hierarchy of priorities for transmission. The position of a channel of information transmitted from a particular port is varied in response to the changing priority of that port's messages as time passes. Variable priority assignments become necessary when low speed priority assignments become necessary when low speed data has been deferred in its transmission until a time just prior to the production of a second unit of data. The effect of changing the priority of deferred data messages in a TDMA burst is to change the relative position of the associated channel within the TDMA burst by means of compiling the address of that message in a higher priority threaded list. The mechanism by which a deferred data message has its priority changed from an initial low value to a subsequent higher value is by measuring the amount of time remaining for retaining a deferred data message relative to the expected time of arrival of the next data message, the impending arrival of a new message causing the priority of the deferred message to be increased, thereby increasing the probability of its successful transmission.

DESCRIPTION OF THE FIGURES

These and other objects, features and advantages of the invention will be more fully appreciated with reference to the accompanying figures.

FIG. 1 shows a transponder relative to the earth.

FIG. 4 is a functional block diagram of the digital switch architecture in the satellite communications controller.

FIG. 5 is a functional block diagram of the organization for the transmit and receive burst buffers.

FIG. 6 is a schematic representation of the switch control memory organization.

FIG. 7 is an illustration of the voice port transmit operation.

FIG. 8 is an illustration of the voice port receive operation.

FIGS. 14, 14A and 14B are a functional block diagram of the burst prioritization mechanism.

FIG. 15 is an illustration of the organization of the burst priority RAM.

FIG. 16 is an illustration of the transmit list structure in the burst priority RAM.

FIGS. 17, 17A and 17B are a timing diagram of the operation of the burst prioritization mechanism.

FIGS. 18, 18A and 18B show the list pointer control.

FIG. 19 shows example operations in the initial pointer storage.

FIGS. 20, 20A and 20B show the voice control.

DISCUSSION OF THE PREFERRED EMBODIMENT

TDMA System Overview

Figure 2:
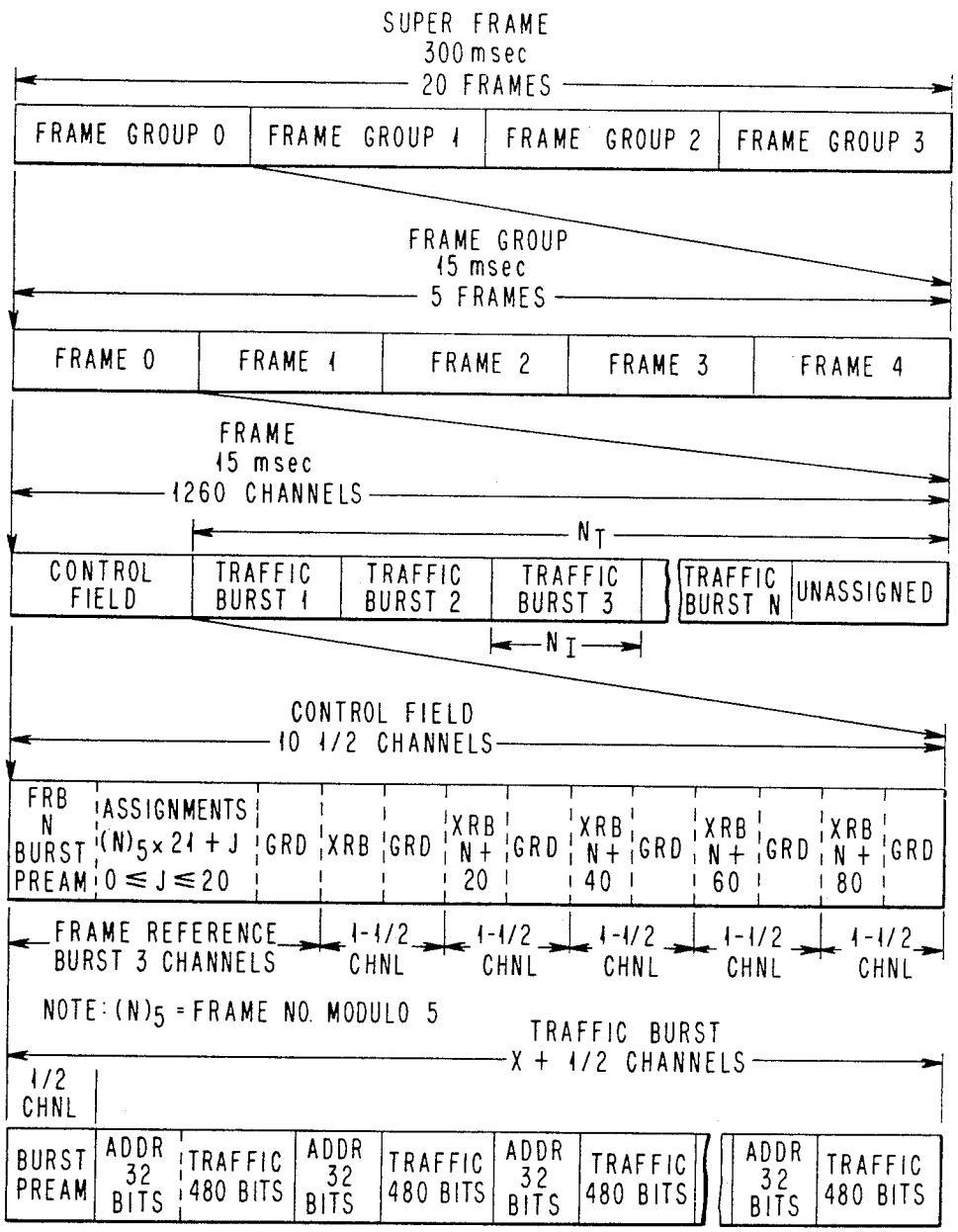
FIG. 2 illustrates the TDMA superframe format.

A schematic illustration of the relative position of the earth stations and the transponder satellite for the time domain multiple access (TDMA) satellite communications system is illustrated in FIG. 1. Subsidiary earth stations 1 and 2 and the reference station 3 on the surface of the earth 4 communicate via the synchronous satellite transponder 5 which orbits at approximately 22,500 miles above the surface of the earth 4, in a geosynchronous orbit. The reference station 3 maintains a uniform timing for the subsidiary stations 1 and 2 and assigns the traffic channel allocations to the subsidiary stations 1 and 2 as is described in the Fennel, et al. patent application cited above. The TDMA communication between the earth stations 1, 2 and 3 is carried out employing a format such as is shown in FIG. 2. Each earth station includes connections to incoming digital lines 10 and voice lines 12 originating from terrestrial sources. These input lines are respectively connected to digital data ports 14, 16 and 18 and voice ports 20 on a satellite communications controller (SCC) 22, shown in functional block diagram in FIG. 3. The SCC 22 is a computer controlled satellite communications switching system which employs digital transmission techniques in the time division multiple access format shown in FIG. 2, which is output to a burst modem 24. On a real time basis, the burst modem 24 encodes the baseband signals received from the satellite communications controller 22 and interfaces with radio frequency equipment 26 at an intermediate frequency. During reception, the burst modem 24 decodes the signals received from the RF equipment 26 and interfaces with the SCC 22 at a baseband frequency. The burst modem 24 is gated on and off during transmission by the SCC 22. The burst modem 24 has a low duty cycle with the on period burst being interleaved with that of the other earth stations on a time sharing basis with the same carrier frequency, consistent with the TDMA mode of operation.

As is shown in the format of FIG. 2, time at the satellite is divided into 15 millisecond units called frames. Each earth station 1, 2 and 3 communicating with the transponder 5 is assigned, by the reference station 3, a portion of the frame in which to transmit its traffic burst. For example, subsidiary station 1 will transmit its traffic burst 7 to the satellite transponder 5 on a first frequency and the satellite transponder 5 will retransmit that traffic burst at a second, noninterfering frequency over the paths 6 and 8 to the other earth stations 2 and 3, respectively, in the network. Each traffic burst is received by all earth stations in communicating on the same transponder frequencies. The amount of time assigned for each earth station's traffic burst may be different for each earth station and also may vary over time. The length of time assigned to each earth station is determined by a demand assignment mechanism disclosed in the above-cited Fennel, et al. patent application. That demand assignment mechanism considers the traffic requirements of each earth station and of the total network to determine on a statistical basis the amount of time each earth station will be assigned in a frame. As is shown in FIG. 2, a frame consists of a fixed time period allocated for transmission of network control and synchronization information and for transmission of traffic, from the active earth stations in the network to one or more other earth stations in the network. The 15 millisecond frame is divided into two segments, the control and the traffic fields. Bursts of information from each of the ground stations are transmitted on a time division multiple access basis in each frame. Each burst contains units of information called channels which consist of 512 binary bits each.

The first part of the frame is the control field. The control field is 10.5 channels in length. The frame control field consists of the frame reference burst (FRB) and five transmit reference bursts (XRB). The FRB is a 2.5 channel burst plus one-half channel of guard time, transmitted once each frame by the reference station. It contains assignment information for 21 earth stations and marks the beginning of each frame. The FRB is used by the SCC 22 at each ground station to maintain frame synchronization.

The transmit reference burst is one channel burst plus a one-half channel of guard time transmitted by each ground station once every 20 frames, called a superframe, as is shown in FIG. 2. Each ground station is assigned a fixed position in one of the frame control fields into which it bursts its transmit reference burst. Each SCC 22 at each ground station uses its transmit reference burst to maintain the transmit clock synchronization. Each SCC 22 also uses its transmit reference burst to transmit demand requests for a transponder capacity, to the reference station 3. With reference to the format of FIG. 2, the remainder of the frame after the control field is the traffic segment. The traffic segment consists of a single traffic burst from each earth station 1, 2 and 3. The length of a traffic burst is variable. Its length and position are assigned in the frame reference burst by the reference station 3. The traffic bursts are used by the earth stations 1, 2 and 3 to transmit traffic and signaling information. During initial transmit acquisition, the transmit reference signal is sent by a local earth station in the traffic field to determine the range to the satellite. That part of the traffic field which remains after all of the subsidiary stations have burst is called the unassigned field.

A frame group consists of five frames and has a period of 75 milliseconds. A frame group is the timing basis for the transmission of the burst assignments to all subsidiary stations in the transponder. The frame group consists of five frame reference bursts with each containing 105 burst assignments. The frame group also contains slots for 25 transmit reference bursts from the respective 25 subsidiary stations to the reference station.

As is shown in FIG. 2, a superframe consists of four frame groups and has a period of 300 milliseconds. The superframe is used as the timing basis for the transmit reference bursts and for changes in the traffic burst assignments. Each earth station transmits its transmit reference burst once every superframe. The reference station 3 transmits a complete set of assignments which is repeated four times in a superframe. New assignments become effective on a superframe boundary, two superframes after the transmission thereof.

SATELLITE COMMUNICATIONS CONTROLLER OVERVIEW

Figure 3:
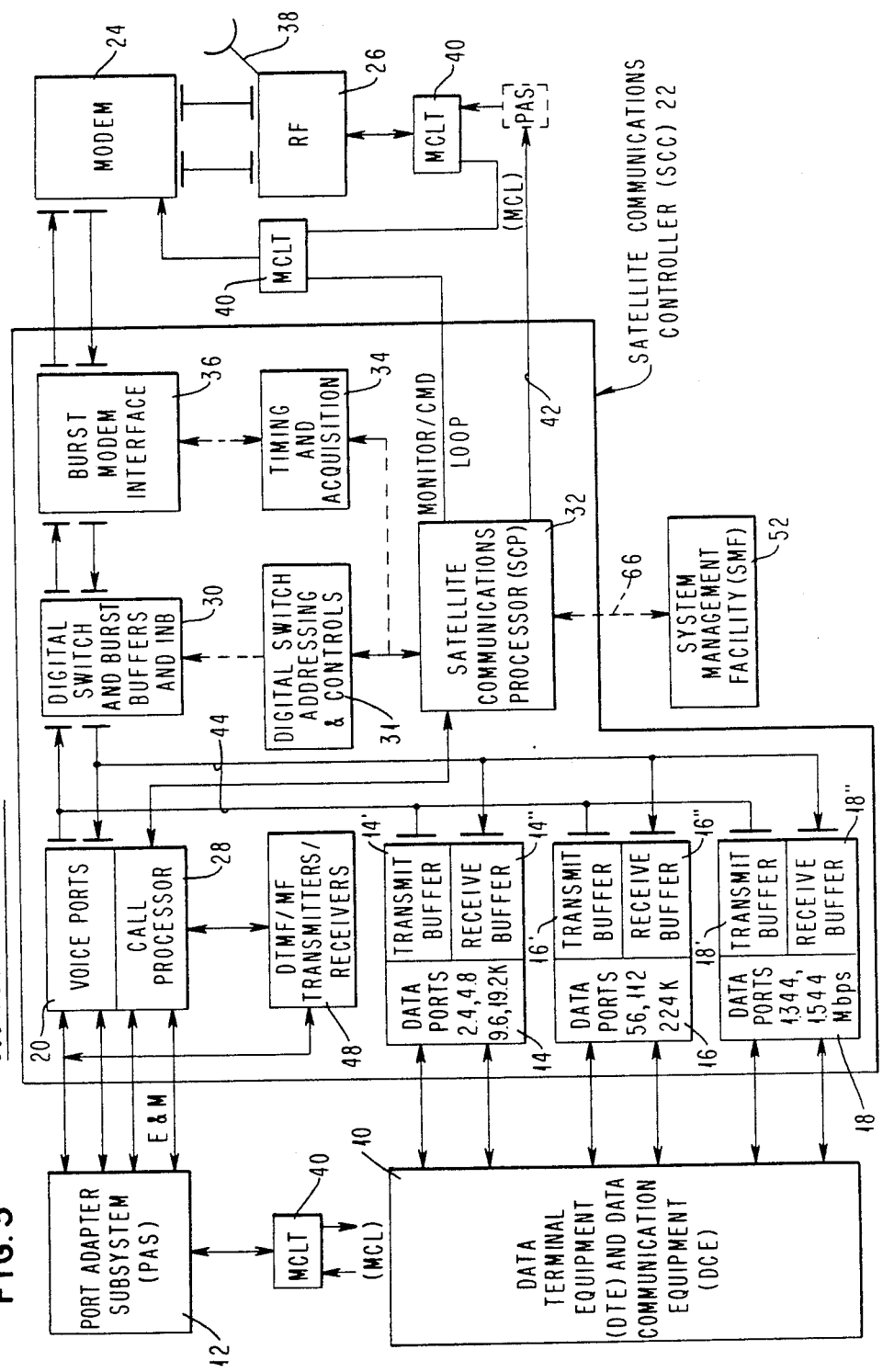
FIG. 3 is an overall block diagram of a satellite communications controller station in the TDMA network.

The satellite communications controller (SCC) 22 of FIG. 3 has five major functional areas, the voice ports 20 which include the associated call processor 28, the data ports 14, 16 and 18, the digital switch 30, the satellite communications processor 32 and the timing and acquisition mechanism 34 and its associated burst modem interface circuitry 36.

As is shown in FIG. 3, the SCC 22 interconnects with telephone facilities via the port adapter subsystem 12. In addition, digital data lines 10 from modems, terminals, and business machines may be directly connected to the data ports 14, 16 and 18. The burst modem interface 36 is provided to enable transmission of information to the burst modem 24 directed to an intended destination earth station and its SCC via the radio frequency terminal 26 and its antenna 38. The monitor and command loop 42 provides a communication path to the other subsystems in the earth station from the satellite communications processor 32 and the monitor and command loop terminals (MCLT) 40 permit the other subsystems to attach to the loop 42.

The voice ports 20 are combined into six voice ports per voice processing unit (VPU) 25 or voice card which converts the analog voice signals to digital form using a delta modulation technique at 32 kilobits per second (Kbps) sampling rate. Conversely, the VPU 25 converts a received digital signal to the corresponding analog voice signal for each voice port. An example of the capacity of an SCC 22 is the servicing of 63 VPUs 25 or 378 voice ports 20.

The data ports 14, 16 and 18 are of three basic types depending on the interface and speed of the data source. The data ports are packaged on one of three digital data processing unit (DDPU) types depending upon the interface and speed. For rates less than 1.344 megabits per second (Mbps), each DDPU provides two data ports which must operate at the same rate. The rate is selected under program control. For 1.344 and 1.544 Mbps, each DDPU supports one data port. As an example, the SCC 22 can support as many as 126 data ports or 63 DDPUs and the mix of VPUs and DDPUs, providing the aggregate bandwidth is less than the total SCC bandwidth of 12.288 Mbps.

The voice ports 20 and data ports 14, 16 and 18 share a common bus 44 to the digital switch 30. The digital switch 30 synchronously samples each port 14, 16, 18 and 20 periodically in a rotating fashion buffering information to be transmitted and routing buffered received information to the appropriate port. The common bus 44 is one eight-bit byte wide and full duplex permitting the simultaneous reception and transmission between the ports and the digital switch 30.

For a convenience, the basic bit rate for the ports in the SCC 22 is defined as the 32 Kbps sampling rate of the voice ports 20, so that all data ports 14, 16 and 18 will be generally referred to herein as being comprised of as many voice-equivalent ports as the magnitude of their respective data rates is related to the magnitude of the voice port sampling rate. For example, a data port having a data rate of 1.280 Mbps which is 40 times the basic voice port sampling rate of 32 Kbps would be considered as being equivalent to 40 voice-equivalent ports. A generalized voice-equivalent port will be designated by the number 21 in FIG. 4 but it is to be recognized that higher speed data ports are equivalent to combinations of the number of voice-equivalent ports 21 having an aggregate data rate which is an integral multiple of that for the basic voice-equivalent port 21.

The digital switch 30 is shown in more detail in the functional block diagram of FIG. 4. The digital switch 30 is under the control of the satellite communications processor (SCP) 32. The SCP 32 is a stored program general purpose digital computer and controls a connection matrix within the digital switch 30, called the switch control memory (SCM) 50. The SCM 50 establishes a correspondence between a particular port 14, 16, 18 or 20 and the address of a connected port at the destination earth station's SCC 22. The SCP 32 control over the SCM 50 is generally indicated by the digital switch addressing and controls 31 shown in FIG. 3. The digital switch 30 appends the port address to transmitted information and directs received information to the addressed port. By appropriately loading and unloading the SCM 50, the SCP 32 can establish point-to-point, multipoint, conference, and broadcast connections and route information to other ports 21 intranodally within the local SCC or internodally to any other SCC 22 in the TDMA network. The SCP 32 can also direct busy and dial audible tones from a read-only storage 46 to any voice port 20.

Signaling information derived from the E and M leads for voice is routed to the SCP 32 via the call processor 28. The SCP 32 accumulates the signaling information and establishes a connection with the destination SCC 22 using a software protocol.

Provision may also be made within the SCC 22 of FIG. 3 to permit dual tone multifrequency and multifrequency (DTMF and MF) converters 48 to be connected between dedicated voice ports 20 and the call processor 28. The converters 48 which are transmitters and receivers, permit the conversion of DTMF/MF tones to a digit and, conversely, a digit to corresponding tone. The digit is processed by the call processor 28 in the same way as a normal rotary dial digit. By intranodally connecting the DTMF/MF trunk voice port to a voice port dedicated to a converter 48, converted DTMF/MF digits can be routed between the trunk and the SCP 32 via the call processor 28.

The timing and acquisition mechanism 34 in FIG. 3 controls the transmission and reception of information between the burst modem 24 and the digital switch 30 via the burst modem interface 36. The timing and acquisition mechanism 34 also provides clocks for digital data ports 14, 16 and 18 and internal clocks for all areas of the SCC 22 which are synchronized with the node designated as the reference station 3. The timing and acquisition mechanism 34 also provides the initial acquisition of the satellite under program control by the SCP 32 and insures proper burst synchronization to the satellite 5.

The monitor and command loop 42 is driven and terminated by the SCP 32 and used to gather status, monitor and control the other subsystems in the earth station. The monitor and command loop terminals (MCLT) 40 permit the subsystems to attach to the loop 42.

The system management facility 52, shown in FIG. 3, which controls the network, is connected to each SCC 22 via the satellite 5 through a dedicated data port and, as an alternate path, through the public switched telephone network to an auto-answer modem connected to the SCP 32.

FLOW OF VOICE TRAFFIC IN THE SCC

The voice ports 20 are combined six at a time into voice processing units 25 which convert incoming analog signals for each voice port to a 32 Kbps digital bit stream in a manner similar to that described in the co-pending U.S. patent application by Hallett, et al., Ser. No. 971,587, that patent application being entitled "Logarithmic Companded Delta Modulator," filed Dec. 20, 1978, and assigned to the instant assignee. The voice processing unit 25 will format this resultant bit stream into eight-bit bytes which are sent to the digital switch 30 once an analog connection has been established. If the connection is internodal, that is to another voice port 20 at another earth station's SCC 22 via the satellite transponder 5, the byte from the voice port 20 at the transmitting location enters the transmit burst buffer 54 shown in FIG. 4, which is located in the digital switch 30, where 60 bytes from the voice ports 20 are accumulated, plus a 32 bit destination address. The complete block of 512 bits, 32 bits for the destination address and 480 bits representing the voice signal, will be transferred from the transmit burst buffer 54 to the burst modem 24. Alternately, if the connection is intranodal, that is to another voice port 20 within the same SCC 22, the byte goes to the intranodal buffer 56 of FIG. 4 in the digital switch 30 for transmission to the local destination voice port 20.

The above process is reversed for voice signals being transferred to the port adapter subsystem 12 from the SCC 22. The voice processing unit 25 will receive the bytes, representing voice signals from a distant earth station's SCC 22 or alternately from another voice port 20 within the same SCC 22, via the digital switch 30. These bytes are processed at a 32 Kbps rate and converted back to an analog signal in the voice processing unit, representing the original analog signal. The voice processing unit 25 has the capability of simultaneously processing the receive signals for six voice ports 20. When a voice port 20 is idle in an on-hook condition, an alternating one/zero pattern will be injected into the voice port unit demodulator which will result in an idle noise level. The voice processing unit 25 also provides for a voice activity compression (VAC) function for each voice port 20. The purpose of the VAC function is to minimize the required satellite link channel capacity between different SCCs 22, by not sending the resultant digital blocks when the lack of voice activity is detected on the incoming analog voice signals. The voice processing unit 25 receiving the digital blocks will fill in the bit stream for conversion to analog signals, with digital blocks representing background noise, when the VAC function occurs at the sending end voice processing unit. The normal receiving rate is 480 bits every 15 milliseconds, that is every TDMA frame, without any VAC function.

FLOW OF DIGITAL DATA TRAFFIC IN THE SCC

The digital data ports 14, 16 and 18 are capable of communicating with business machines and modems. The digital data processing units (DDPU) support a variety of data rates and have a modularity of either one of two data ports per DDPU. A first type of digital data processing unit 14 can serve as a data port for data rates of 2.4, 4.8, 9.6 or 19.2 Kbps. A second type digital data processing unit 16 can serve as the data port for 56, 112, or 224 Kbps data rate. A third type digital data processing unit 18 can serve as the data port for 448, 1,344 and 1,544 Kbps data rates. The selection of a data rate is programmably set by the SCP 32. The first and second type digital data processing units 14 and 16 can serve as two data ports each. The third type digital data processing unit 18 can serve as a single data port. The SCC 22 can support as many as 126 data ports, for example, provided that the aggregate data rate does not exceed the 12.288 Mbps total digital switch bandwidth of the SCC. A data buffer in each data port provides elasticity to compensate for the differences between the external interface timing and the internal SCC timing and also accumulates information in 480 bit blocks between the port and the digital switch 30. Information is transferred between the port and the digital switch 30 via the byte wide transmit receive common bus 44. Forward error correcting codes can be applied selectively to the data ports under the SCP program control.

Data activity compression (DAC) is provided for each data port 14, 16 and 18. DAC is analogous to VAC, since information is not transmitted if each byte in the frame is identical to the last byte transmitted in the previous frame. When the destination SCC fails to receive a block as expected, it repeats the last byte previously received for the duration of that block. In this way, the satellite link channel capacity is conserved by not transmitting idle characters and repetitive information.

OVERVIEW OF THE DIGITAL SWITCH

The principal function of the digital switch 30 is to support the transfer of traffic among the ports 21 both intranodally within a single SCC and internodally between separate earth station's SCCs. The digital switch 30 interfaces with the ports 21 via the byte wide full duplex transmit/receive bus 44 which is capable of supporting 384×32 Kbps full duplex. A byte of transmitted information acquired from a port 21 over the transmit bus 44a is retained in the intranodal buffer (INB) 56 of FIG. 4. This byte can subsequently be delivered via the receive bus 44b to another port 21 connected intranodally to the first port. The byte of transmit information is also retained in the transmit burst buffer (TBB) 54, where transmit bytes from the same port 21 are accumulated into 60 byte blocks which is equivalent to a channel, prior to transmission to the satellite 5.

In a given TDMA frame, not all active ports 21 require the transmission of a channel or channels of information due to voice activity compression (VAC) and data activity compression (DAC). Advantage is taken of this fact and, as a result, the SCC 22 will have fewer channels allocated to it than would be required if the ports 21 operated without VAC and DAC. It is therefore possible that the number of channels to be sent may exceed the number allocated to the SCC 22 at a particular earth station. Those ports 21 with channels which require transmission but which were not sent or referred to as being "frozen-out." Because freeze-out is a possibility, the ports 21 are assigned a relative priority to assure that information with the highest requirement for integrity is sent first.

Traffic to be sent to the satellite 5 can be error protected using the forward error correction (FEC) and cyclic redundancy code (CRC) encoder 58 of FIG. 4, the encoding of which is a selectible option for each port 21.

All traffic channels to be sent to the satellite 5 are appended with a destination address and serialized by symbol to the burst modem interface 36. Upon receipt of a traffic channel and subsequent to its error correction, the destination address is examined by the receive address interpretation mechanism 60 to determine if the associated channel of information is destined for this SCC. If the channel of information is in fact destined for this SCC, the channel is placed in an elastic buffer 62 of FIG. 4. The elastic buffer 62 is employed to decouple the receive path from variations in receive timing due to eccentricities and variations in the inclination of the orbit of the satellite 5.

Received channels which have passed through the elastic buffer 62 are moved into the receive burst buffer (RBB) 64. The contents of the RBB 64, the INB 56 and the tone ROS 46 which contains specific audible tones, are the potential sources of receive information for each port 21 in FIG. 4.

The satellite communications processor (SCP) 32 contains a control program which accepts call messages and allocates satellite transmission resources locally. Call information is received from a local trunk via E and M signaling, and from a distant SCC via the common signaling channel from the satellite 5. Connections are made by passing control information to the digital switch 30 via the digital switch addressing and controls 31. The SCP control program also continuously collects hardware status information and call activity information for transmission to the system management facility (SMF) 52.

The system management facility (SMF) 52 has indirect monitoring and control capability over the SCC hardware. An SMF communications controller is the primary station in the data link 66 connecting it to each respective SCC 22, and periodically polls each SCC 22. The data link 66 is a dedicated, multidrop satellite circuit.

DETAILED DESCRIPTION OF THE DIGITAL SWITCH

Turning now to a more detailed description of the operation of the digital switch, the digital switch 30, shown in FIG. 4, supports the functions of moving information from the voice and digital data ports to the burst modem and vice versa, supports intranodal connections between ports, supports conferencing and multipoint data connections, and delivers audible tones to the voice ports. All of these operations are controlled indirectly by the SCP 32 via parameters which are specified by the SCP and retained in the switch control memory (SCM) 50. These parameters identify a specific local port 21, where information from that port is to be retained prior to transfer (to either a local port via the intranodal buffer 56 or to the burst modem via the transmit burst buffer 54), and the source of information which will be going back to the local port (that is the intranodal buffer 56, the receive burst buffer 64, or the tone ROS 46).

The VPUs 25, each with six voice ports 20, and the data ports 14, 16 and 18 are mounted on voice/data boards labeled 27 in FIG. 5, within the SCC 22. FIG. 5 illustrates the bus connection between the voice/data boards 27 and the transmit burst buffer 54, intranodal buffer 56 and receive burst buffer 64. A transmit bus 44a connects the voice/data boards 27 to the transmit burst buffers 54 and the intranodal buffer 56. The output of the transmit burst buffers 54 is connected through the output bus 45 to the FEC encoder 58 and transmit source selection mechanism 68.

The receive bus 44b connects the inputs of the voice/data boards 27 to the output of the tone ROS 46, the output of the intranodal buffer 56, and the outputs of the receive burst buffer 64. The inputs of the receive burst buffer 64 are connected by means of the bus 47 to the elastic buffer 62.

The switch control memory (SCM) 50 has as the contents of each of its RAM locations, the identity of a local port, the type of port identified, the buffer location (intranodal buffer or transmit burst buffer partition) in which data from a port is retained prior to transmission, and the buffer location (intranodal buffer or receive burst buffer partition) in which receive data is held prior to delivery to the port, the identity of an audible tone to be delivered to the port and additional controls. Each SCM RAM location is six bytes long with the bytes labeled zero through five. Table I indicates the significance of each byte in the SCM word format.

TABLE I

| Byte 0 | Byte 1 | Byte 2 | Byte 3 | Byte 4 | Byte 5 |
|---|---|---|---|---|---|
| Local Port ID | Program Message | Port Type | RBB/INB | Buffer Address | Tone Address |

SCM Word Format

Each of the SCM bytes in the SCM word contain eight bits. There are 420 RAM locations or entries in the SCM 50. An entry is accessed in the SCM once every 595 nanoseconds. The entire SCM 50 is scanned in 420×595 nanoseconds or 250 microseconds. This is referred to as the SCM scan time. All 420 SCM entries are selected independent of the actual number of ports 21 installed on a particular SCC.

The ordering of the SCM entries is shown in FIG. 6. There are 384 SCM entries which are used to transfer data to/from the ports 21. Each of these port access entries accept a byte of information from a specific port 21 and delivers a byte of information to that port 21 every 250 microseconds. Therefore, an SCM entry accepts/delivers data from/to a port 21 at eight bits/250 microseconds which is equivalent to a 32 Kbps data rate. The data bandwidth of the bus 44 is therefore 384×32 Kbps which is 12.288 Mbps. The times on the transmit/receive bus 44 associated with these SCM entries are referred to as port access slots.

The remaining 36 SCM entries are set aside to provide the SCP 32 with an opportunity to pass control information to the ports 21 or to update the SCM 50. Six of these 36 SCM entries are set aside in order that the SCP 32 can transfer a byte of control information (referred to as status) to a specific port 21. Six of these status entries are required in order to assure the SCP access to any of the six voice ports 20 associated with a voice processing unit card 25. The times on the transmit/receive bus 44 associated with these six SCM entries are referred to as port status slots. The other 30 of the 36 SCM entries are set aside in order that the SCP 32 can update the SCM 50. Any six byte SCM entry can be updated during any one of these 595 nanosecond slots. The times on the transmit/receive bus 44 associated with these 30 SCM entries are referred to as the SCM update slots. These entries are normally set to zero and are not used. However when the SCM 50 is configured with six SCM update slots, the 24 update slots which are not adjacent to status slots can be used as port access slots. The SCM hardware can treat all 30 of these entries as port access entries if no SCM update is pending, to increase overall bandwidth. Table II shows the SCM entry format for the SCM byte zero through five, each byte containing eight bits of control information.

TABLE II
SCM ENTRY FORMAT

SCM BYTE 0

| When Bit 0 = 1, | bits 1 through 7 identify a port to be selected |
|---|---|

Voice or Data Port Selection

| When Bit 0 | = | 1, then |
|---|---|---|
| Bits 1–2: | | port board address |
| 3–6: | | port card address |
| 7: | | digital data port address (i.e. port 0 or 1) |

(The Digital Switch is structured to support 384×32 Kbps ports. The ports to be selected and the order in which they are to be selected are specified in the SCM. The seven bit port address is decoded to select a board and one of 16 cards within that board. The seventh bit is used to identify one of two ports associated with a digital data card).

| When Bit 0 = 0, | bits 1 through 7 identify alternate functions to be performed by the SCM |
|---|---|

Alternate Decodes of Byte 0

| When Bit 0 | = | 0, then |
|---|---|---|
| a. | $\bar{0} > 3 > 4$: | test card select |
| Bits 1–2: | | identify the board containing the test card. |
| Bits 5–6: | | must equal 0 0 |
| Bit 7: | | reserved |
| b. | $\bar{0} > \bar{3} > 4$: | Mode Set Command (this command is valid only in a port status entry). |
| Bit 5=0: | | SCM supports 30 "SCM update slots" |
| Bit 5=1: | | SCM supports 6 "SCM update slots" |
| c. | $\bar{0} > 3 > \bar{4}$: | force errors |
| d. | $\bar{0} > \bar{3} > \bar{4}$: | SCM invalid |

SCM BYTE 1

| Reserved for program |
|---|

SCM BYTE 2

| Bit 0: | Satellite active |
|---|---|
| 1: | apply FEC |
| 2–4: | port type code defined as follows: |
| 000: | 2.4K deferrable data port |
| 001: | 4.8K deferrable data port |
| 010: | 9.6K deferrable data port |
| 011: | 19.2K deferrable data port |
| 100: | diagnostic code |
| 101: | unused |
| 110: | voice port |
| 111: | non-deferrable data port |
| 5–7: | reserved (must be zero) |

SCM BYTE 3

| Bit 0: | port wrap |
|---|---|
| 1: | reserved |
| 2: | use RBB |
| 3: | use INB |
| 4: | intranodal conference |
| 5: | not last partition user |
| 6–7: | INB/TBB/RBB partition address |

TABLE II-continued

SCM ENTRY FORMAT (2 most significant bits)

SCM BYTE 4

| | |
|---|---|
| Bit 0–6: | INB/TBB/RBB partition address (7 least significant bits) |
| 7: | conditional write |
| Note: | For status entries, byte 4 is loaded with the status to be sent to the port. (See SCM ORGANIZATION below.) |

SCM BYTE 5

When SCM byte 0 indicates some state other than mode set, then SCM byte 5 is defined as follows:
| | |
|---|---|
| Bit 0–2: | reserved |
| 3–7: | tone address field |

When SCM byte 0 indicates the mode set state, then SCM byte 5 is defined as follows:
| | |
|---|---|
| Bit 0: | ignore tone error |
| Bit 1: | ignore RBB error |
| Bit 2–7: | identifies the 250 usec boundary of the transmit clock on which the receive frame sync should be raised. |

The operation of the SCM 50 in carrying out voice port selection can be explained as follows. Each voice card 25 supports one encode/decode module (CODEC), which in turn supports six voice ports 20. Each CODEC multiplexes the output of six voice ports 20 onto the transmission bus 44a, as is shown in FIG. 7. A new byte of information from a given voice port 20 is available for transmission every 250 microseconds. A byte of information from one of the six voice ports 20 associated with a given voice card 25 is available every 250/6 or 41 microseconds. Operations on the receive bus 44b are similarly multiplexed. FIG. 7 is a representation of the voice card 25 and the operations that occur during one 41 microsecond period when, for example, voice port zero is capable of placing a byte on the transmit bus 44a and accepting a byte from the receive bus 44b, shown in FIG. 8.

All of the voice cards 25 are in frame synchronization; that is, transmit frame synchronization causes all voice cards 25 to make port zero available to the bus 44 simultaneously. All voice ports labeled 1 will be available to the bus 41 microseconds later, and etc. A specific voice port 20 can be selected in any one of the sixty-four 595 nanosecond port access slots that occur during the 41 microsecond period when that voice port is accessible.

Figure 13:
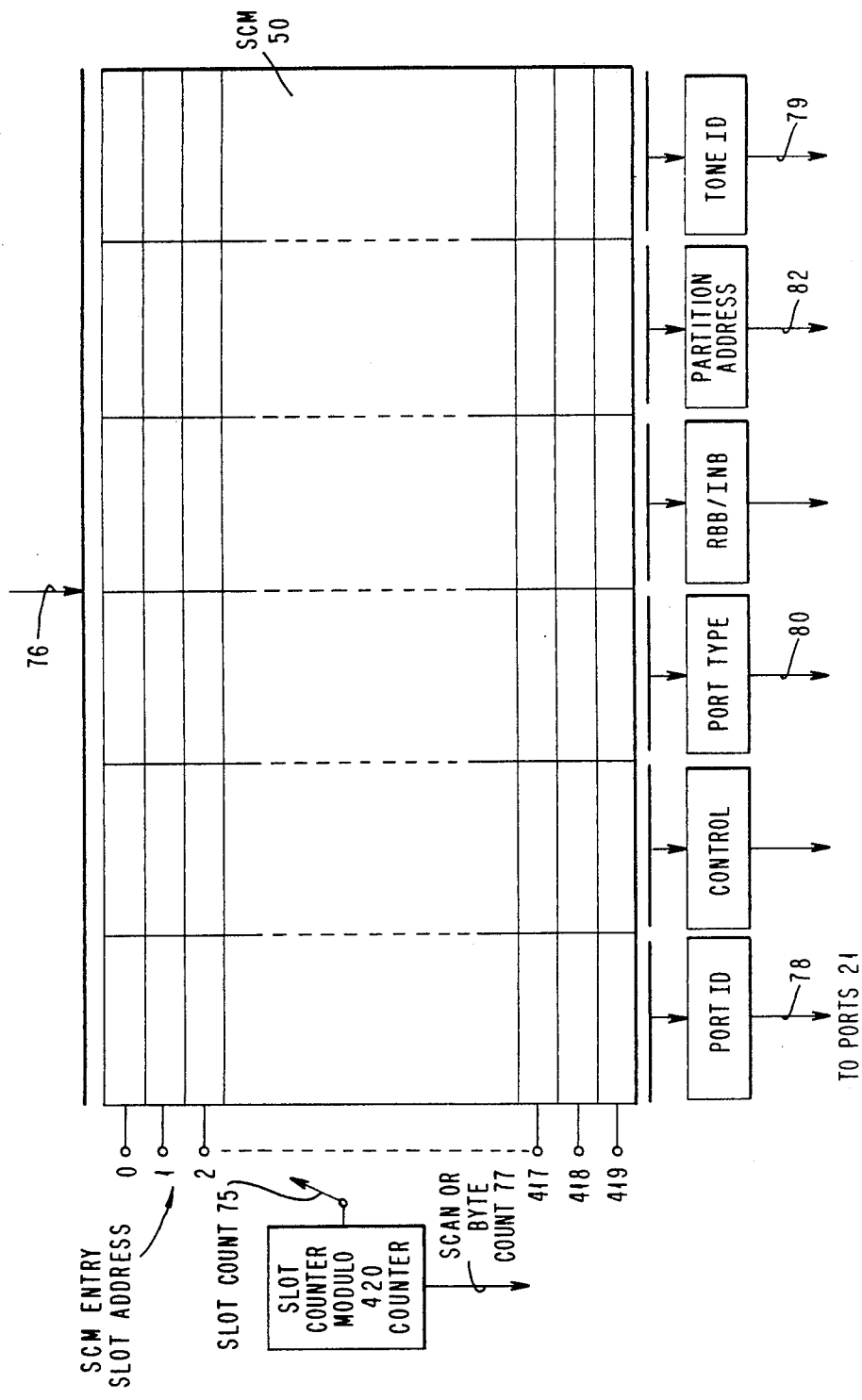
FIG. 13 is a schematic illustration of the switch control memory.

The SCM 50 is also in frame synchronization. The bus slot counter 70 of FIG. 13, which addresses entries in the SCM 50, is returned to 0 at transmit frame sync time, thereby selecting the 0-th entry of the SCM 50. This 0-th entry will be selected again, 250 microseconds later after a complete scan of the SCM 50. The receive timing will be adjusted via the digital switch elastic buffer 62 in such a manner that the receive frame sync timing, as seen by the voice ports 20, will occur on a 250 microsecond boundary of the transmit clock. This will be coincident with access to the location zero of the SCM 50.

Therefore, the first sixty-four port access entries of the SCM 50 will control transmit/receive operations for all of the voice ports labeled as 0. The second set of sixty-four port access entries of the SCM 50 will control operations for all voice ports labeled 1, and etc.

A voice port 20 is selected 60 times in one 15 millisecond frame. The 60 bytes presented to the bus 44 as a result of these selects are accumulated in a partition of the transmit burst buffer (TBB) 54. Selected partitions of the TBB 54 will subsequently be transmitted to the satellite 5 in the form of traffic channels. Therefore, each entry of the SCM 50 must be thought of as developing one channel (referred to as a port channel) of information per TDMA frame. Each byte presented to the bus 44 by a voice port 20 is accompanied by an indication as to whether or not the byte exceeded the voice activity compression (VAC) threshold. Signals below the VAC threshold contain so little information that they can be ignored. A channel in which the VAC threshold was never exceeded contains no useful information and is not transmitted from the TBB 54.

The receive burst buffer (RBB) 64 performs a buffering function for reception of information from the satellite 5 in a manner analogous to that performed by the TBB 54 for transmit operations. A received channel of information destined for a local voice port 20 is buffered in a partition of the RBB 64. The 60 bytes so buffered will be subsequently delivered to the voice ports 20 during one 15 millisecond frame. If no channel is received, the missing channel is assumed to have been subjected to voice activity compression and background noise is then delivered to the local voice port 20.

The operation of the SCM 50 in selecting digital data ports will now be described. A digital data port 14, 16 or 18 may operate at one of several rates such as is shown in Table III. Table III illustrates the average port rate achieved by varying the number of 32 Kbps channels sent per frame.

TABLE III

Average Port Rate Achieved by Varying the Number of 32 Kbps Channels Sent Per Frame

| User Data Rate (Kbps) | Data Rate as a Function of FEC Option Invoked ½ FEC Applied by Port ¼ FEC Applied by Digital Sw (Kbps) | Average Channels Developed per Frame as a Funct. of FEC Opt. Invoked | Voice Equiv. Ports (N) Equal to the Number of SCM Entries Required | Number of Channels Sent/Received in Each Frame Until Pattern Repeats ** (2.4 Kbps Pattern is Shown Folded at 20 Frames) | | | | | | | | | | | | | | | | | | | |
|---|---|---|---|---|---|---|---|---|---|---|---|---|---|---|---|---|---|---|---|---|---|---|---|
| | | | | 0 | 1 | 2 | 3 | 4 | 5 | 6 | 7 | 8 | 9 | 10 | 11 | 12 | 13 | 14 | 15 | 16 | 17 | 18 | 19 |
| 2.4* | 2.4 (w/o FEC) | 3/40 | 1 | **1 | 0 | 0 | 0 | 0 | 0 | 0 | 0 0 0 | | | 0 | 0 | 0 | 0 | -1 | 0 | 0 | 0 | 0 | 0 |
| | | | | 0 | 0 | 0 | 0 | 0 | 0 | 0 | 1 0 0 | | | 0 | 0 | 0 | 0 | 0 | 0 | 0 | 0 | 0 | 0 |
| | 4.8 (w ½ Rate FEC) | 3/20 | 1 | **2 | 0 | 0 | 0 | 0 | 0 | 0 | 0 0 0 | | | 0 | 0 | 0 | 2 | 0 | 0 | 0 | 0 | 0 | 0 |
| | | | | 0 | 0 | 0 | 0 | 0 | 0 | 0 | 2 0 0 | | | 0 | 0 | 0 | 0 | 0 | 0 | 0 | 0 | 0 | 0 |
| 4.8* | 4.8 (w/o FEC) | 3/20 | 1 | 1 | 0 | 0 | 0 | 0 | 0 | 0 | 1 0 0 | | | 0 | 0 | 0 | 1 | 0 | 0 | 0 | 0 | 0 | 0 |
| | 9.6 (w ½ Rate FEC) | 3/10 | 1 | 2 | 0 | 0 | 0 | 0 | 0 | 0 | 2 0 0 | | | 0 | 0 | 0 | 2 | 0 | 0 | 0 | 0 | 0 | 0 |
| 9.6* | 9.6 (w/o FEC) | 3/10 | 1 | 1 | 0 | 0 | 0 | 1 | 0 | 0 | 1 0 0 | | | | | | | | | | | | |
| | 19.2 (w ½ Rate FEC) | 3/5 | 1 | 2 | 0 | 0 | 0 | 2 | 0 | 0 | 2 0 0 | | | | | | | | | | | | |
| 19.2* | 19.2 (w/o FEC) | 3/5 | 1 | 1 | 0 | 1 | 0 | 1 | | | | | | | | | | | | | | | |
| | 38.4 (w ½ Rate FEC) | 1 1/5 | 1 | 2 | 0 | 2 | 0 | 2 | | | | | | | | | | | | | | | |

TABLE III-continued
Average Port Rate Achieved by Varying the Number of 32 Kbps Channels Sent Per Frame

| User Data Rate (Kbps) | Data Rate as a Function of FEC Option Invoked ¼ FEC Applied by Port ½ FEC Applied by Digital Sw (Kbps) | Average Channels Developed per Frame as a Funct. of FEC Opt. Invoked | Voice Equiv. Ports (N) Equal to the Number of SCM Entries Required | Number of Channels Sent/Received in Each Frame Until Pattern Repeats ** (2.4 Kbps Pattern is Shown Folded at 20 Frames) 0 1 2 3 4 5 6 7 8 9 10 11 12 13 14 15 16 17 18 19 |
|---|---|---|---|---|
|  | 56 (w/o FEC) | 1¾ | 2 | 2 1 2 2 |
| 56 | 112 (w ¼ Rate FEC) | 3¼ | 2 | 4 2 4 4 |
|  | 112 (w/o FEC) | 3½ | 4 | 4 3 |
| 112 | 224 (w ¼ Rate FEC) | 7 | 4 | 8 6 |
|  | 224 (w/o FEC) | 7 | 7 | 7 |
| 224 | 448 (w ¼ Rate FEC) | 14 | 7 | 14 |
|  | 1344 (w/o FEC) | 42 | 42 | 42 |
|  | 1536 (w ⅞ Rate FEC) | 48 | 48 | 48 |
| 1344 | 2688 (w ½ Rate FEC) | 84 | 42 | 84 |
|  | 1544 (w/o FEC) | 48¼ | 49 | 48 48 48 49 |
|  | 1764 4/7 (w ⅞ Rate FEC) | 55 1/7 | 56 | 55 55 55 55 55 55 56 |
| 1544 | 3088 (w ½ Rate FEC) | 96½ | 49 | 96 96 96 98 |

*Can Operate in Deferrable Mode

An entry from the SCM 50 will support a 32 Kbps full duplex data rate. It follows that a digital data port will require a magnitude of N such entries in the SCM 50 where N is the data port rate as seen at the bus 44 divided by the basic 32 Kbps data rate, with N being rounded up to the next whole integer. The data port 14, 16 or 18 is selected N times every 250 microseconds, once for each associated entry in the SCM 50. The data port transmits/receives a byte as a result of each select by the SCM 50. These data bytes are accumulated in/retrieved from the TBB 54/RBB 64 partition identified by each entry of the SCM 50. No relationship exists among these N partitions in the TBB 54 (or RBB 64). Every N-th byte transmitted/received by the data port 14, 16 or 18 will be associated with the same partition in the TBB 54/RBB 64.

Each byte transmitted from a digital data port 14, 16 or 18 is accompanied by an indication as to whether the byte currently being transferred is equal to the last byte of the immediately preceding frame. This is referred to as the data activity compression (DAC) indication. Each byte transmitted by a digital data port is also accompanied by an indication as to whether the data port detected a carrier from its terrestrial source when the byte was acquired at the port interface. This is referred to as the carrier detect indication. This bit is a reflection of the state of the receive line signal detector located in the data port.

If all bytes of the channel have been accompanied by a DAC indication, the channel contains no new information beyond that contained in the last byte of the preceding frame, and is therefore not transmitted from the partition within which it is stored in the TBB 54. This channel can then be reconstructed at the destination digital data port at the receiving earth station by the receiving data port remembering the last byte received in the last frame.

As can be seen with reference to Table III, not all data speeds result in an integral number of channels per frame. Of those data speeds which do not, the data port 14, 16 or 18 varies the number of channels developed per frame, in order to achieve the desired average data rate. The digital data port accomplished this by sending data in only N−1 of the N channels associated with a particular data speed for a specific number of frames. The N-th channel select is subjected to data activity compression and, therefore, the N-th channel is not transmitted from the data port to the TBB 54 or from the TBB 54 to the satellite 5. In the next frame, all N channels are transferred from the data port to the TBB 54. Table III shows the number of channels associated with each frame over the number of frames the digital data port must average the data rate of that data port.

Digital data port speeds of greater than 32 Kbps are referred to as non-deferrable data. At these data speeds, a digital data port develops at least one channel's worth of information per TDMA frame. The variation in the number of channels developed per frame is never greater than one for a specific digital data port. That is, it develops either N or N−1 channels per frame. Several digital data ports, for example P ports, operating at the same speed will amplify this variation in channels developed, since they are in synchronization. For P ports, the variation would be P channels.

Digital data ports 14 having data speeds less than or equal to 32 Kbps are referred to as deferrable data. At these relatively slower data rates, a digital data port does not develop a channel's worth of information every TDMA frame. Several digital data ports operating at the same speed can each develop a channel's worth of information for transmission in the same frame. Thus, a possible surge in traffic channel demand might occur. This demand can be smoothed by carrying out the transmission of the channel's worth of information accumulated in the associated partition of the TBB 54 in some frame preceding the frame in which the digital data port presents still another channel's worth of information for transmission by the TBB 54. Thus, the average data rate of such a relatively slow digital data port 14 is sustained although the frame in which a channel may be transmitted/received may vary. Digital data ports managed in this manner are referred to as deferrable data ports.

A channel of information developed by a digital data port operating in this deferrable mode is placed in an associated partition of the TBB 54. As is seen with reference to FIG. 5, the TBB 54 is an A/B buffer with sufficient buffering to retain one channel in the A side and one channel in the B side for a number of voice-equivalent ports. During one frame, the A side of the TBB accumulates channels from a number of voice-equivalent ports. During the same frame, the B side of the TBB is available for transmission to the burst modem 24. In the next frame, the roles of the A side and the B side of the TBB are reversed. Thus for illustrating the operation of the deferrable data mode for relatively low speed data ports 14, it is assumed that a channel of information developed by the data port is placed in the partition location X of the A side of the TBB 54 during one frame and in the corresponding partition location X of the B side of the TBB 54 during the following frame. In this manner, it is certain that the channel of information will be available for transmission during any frame. This channel of information is serviced at the lowest priority level until the frame occurs in which the deferrable data port 14 develops a new channel's worth of information and places it in the B side of the TBB 54. If the old channel's worth of information has not yet been sent by the A side of the TBB 54, the old channel of information is serviced at the highest data port priority level to assure that the channel is transmitted from the TBB over the burst modem 24 so that the integrity of the communications is maintained.

By deferring low speed data transmission in this manner, the demand for transmitted channels can typically be smoothed across many frames by using unoccupied channels in the TDMA burst which would otherwise be unused. A number of such unoccupied channels in the TDMA burst will normally be available to low priority ports due to variations in the number of transmit channels required per frame for data speeds greater than 32 Kbps and those channels not required as a result of voice activity compression and data activity compression generating unoccupied channels in the TDMA burst.

Information buffering in the transmit operations is explained as follows. A port 21 selected by the SCM 50 will place a byte of information on the transmit bus 44a. If the selected port 21 is a voice port 20, the information byte is accompanied by an appropriate VAC indication. If the selected port is a digital data port 14, 16 or 18, the information byte will be accompanied by an appropriate DAC and carrier detect indications. The contents of the transmit bus 44a are written into the intranodal buffer (INB) 56 and the transmit burst buffer (TBB) 54 partition identified by the entry in the SCM 50 which selected the ports 21.

Figure 9:
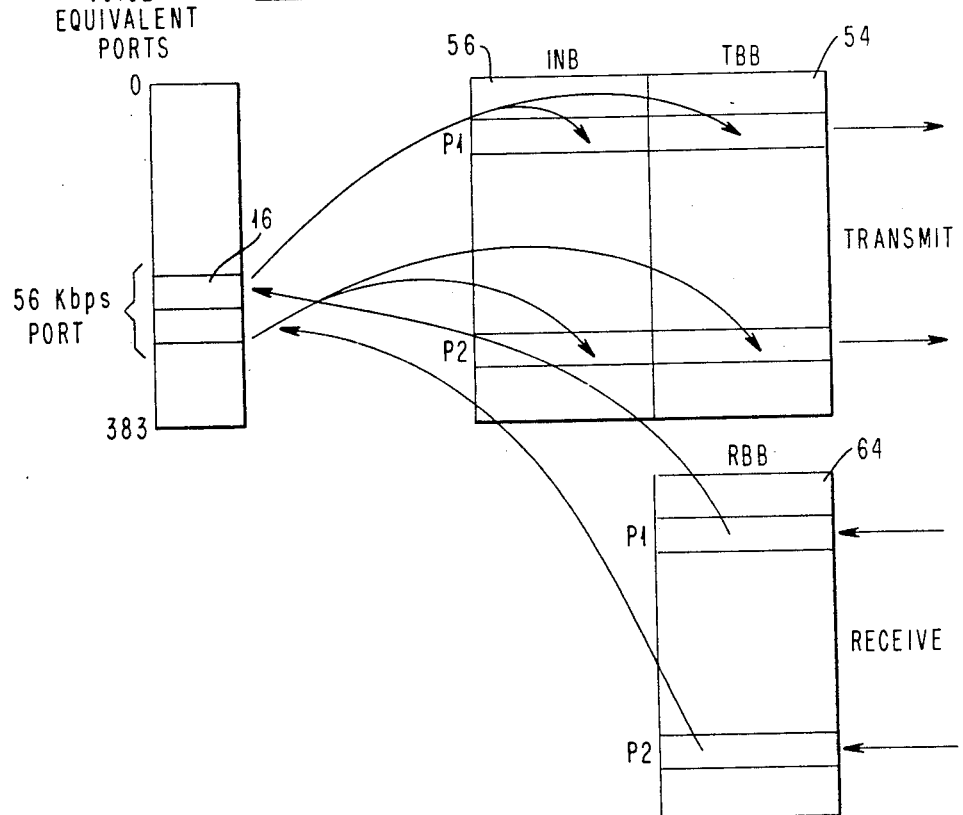
FIG. 9 is a schematic illustration of message routing for a 56 Kbps data port operating point-to-point.
Figure 10:
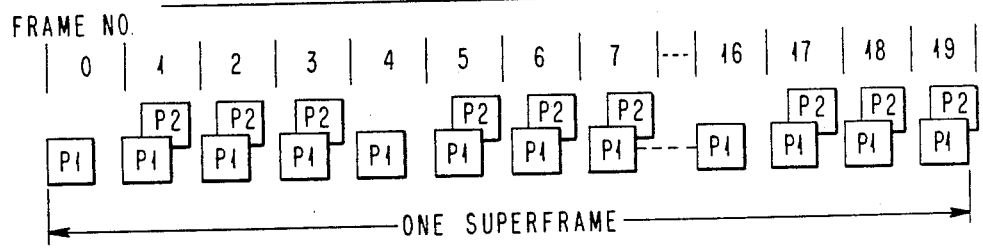
FIG. 10 is an illustration of the format during one superframe for the port channels sent for the 56 Kbps port of FIG. 9.

FIG. 9 is a schematic representation of the message routing for an example 56 Kbps data port 16 and FIG. 10 illustrates how a channel's worth of information developed by the digital data port 16 is formatted during one TDMA superframe, when the 56 Kbps digital data port 16 operates point-to-point via the satellite 5. A 56 Kbps digital data port represents two voice equivalent ports 21 (that is N=2). For FIGS. 9 and 10, P1 and P2 represents the partitions in the intranodal buffer 56 and the transmit burst buffer 54 identified by the two entries in the SCM 50 associated with this particular port. The port 16 will transfer one channel's worth of information to the digital switch 30 in the first TDMA frame of the superframe and two channels' worth of information in the next three TDMA frames, as is shown in Table III. The pattern will then be repeated. The resultant average data rate is then 56 Kbps. In those TDMA frames in which the port 16 is transferring one channel's worth of information, the select generated by the second entry of the SCM 50 is responded to by the port 16 with a DAC indication. Thus, the INB/TBB partition P2 will be interpreted to contain no useful information and will not be transmitted. The select associated with the first entry of the SCM 50 is responded to by presenting information received from the terrestrial interface to the port 16. As a result, the INB/TBB partition P1 will contain port information and will be transmitted (assuming it is not subjected to DAC). The receiving port at the destination earth station is in synchronization with the transmitting port 16 and expects only one channel of information.

In those TDMA frames in which the 56 Kbps port 16 is transferring two channels' worth of information, the selects associated with the first/second entries of the SCM 50 result in data being retained in the P1/P2 TBB partitions, respectively. Again, the receiving port at the destination location is in synchronization with the transmitting port 16 and expects two channels' worth of information. A destination port which does not receive the anticipated two channels' worth of information will assume those two channels to have been subjected to DAC.

In summary, it is the data port 16 which manages the presentation of the channel's worth of information to the digital switch 30 in order to achieve the desired average data rate.

The intranodal buffer (INB) 56 buffers all information passing among ports 21 associated with the same SCC 22. The INB 56 is an A/B buffer with sufficient buffering to retain one byte in the A side and one byte in the B side for each of the 384 voice equivalent ports selected by the SCM 50. During one 250 microsecond scan of the SCM 50, one side of the INB 56, for example the A side, is loaded with one byte from each of the 384 voice equivalent ports selected by the SCM 50. The other half of the INB 56, that is the B side, is available as a source of receive information (along with the tone ROS 46 and the RBB 64) for the ports 21. In the next scan of the SCM 50, the roles of the A side and B side of the INB 56 are reversed. The VAC or carrier detect indication accompanying each transmit byte from ports 21, is retained in an array referred to as the INB-loaded array 72. The INB-loaded array 72 is an A/B buffer with 384 partitions such that a VAC or carrier detect indication is retained for each byte in the INB 56. The contents of this array influences the choice of the source of receive information for the port 21.

Figure 11:
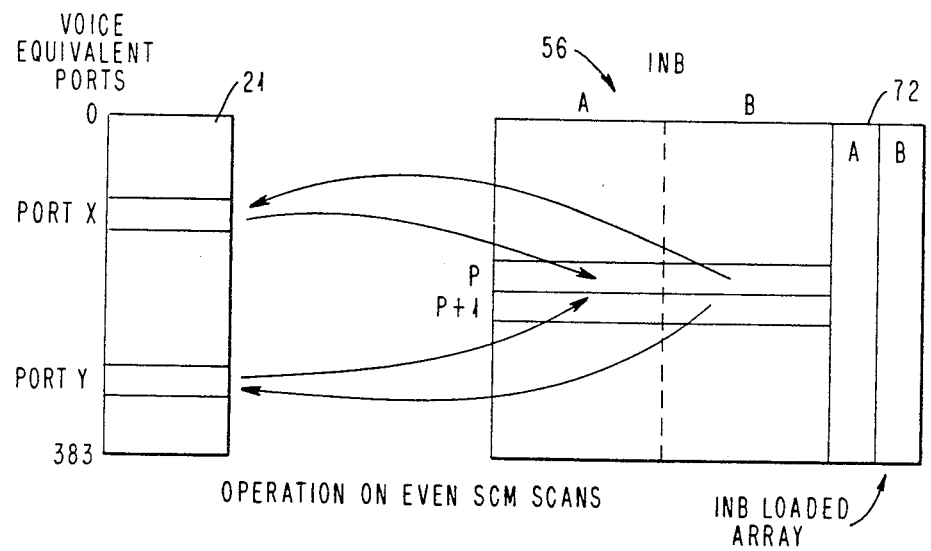
FIG. 11 is a schematic representation of the message routing for intranodal communication on an even SCM scan.
Figure 12:
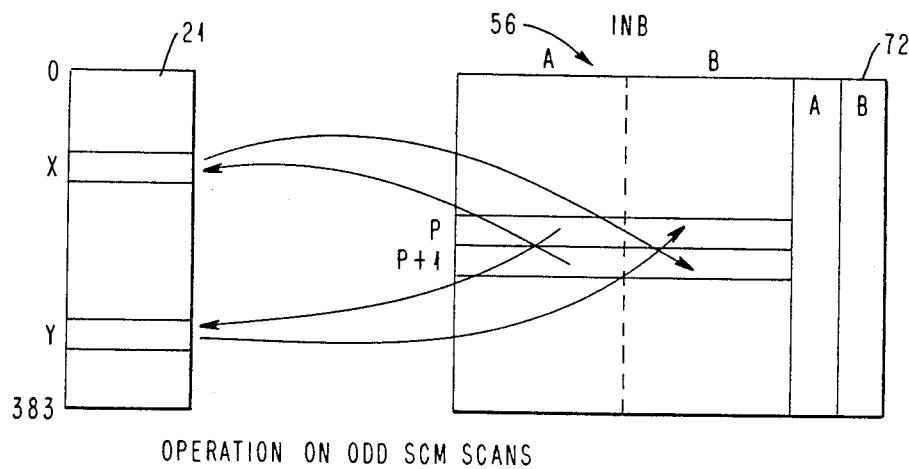
FIG. 12 is a schematic illustration of the message routing for intranodal communication during an odd SCM scan.

The SCM 50 associates a voice equivalent port 21 with a single partition of the TBB 54, the RBB 64, and the INB 56. The partition of the INB 56 with which the voice equivalent ports 21 is associated is alternated between two partitions by inverting the low order bit of the partition address on odd scans of the SCM 50, that is every first, third, . . . 59th, scan of the SCM 50. Two ports 21 communicating intranodally within the same SCC 22, are assigned N even/odd pair of partitions (for a voice port, N equals one). Therefore, in one 250 microsecond scan of the SCM 50, a port 21 writes N bytes into the INB 56 (which will be read by the other port in the following SCM scan) and it reads N bytes (which were written by the other port into the INB in the preceding SCM scan). FIGS. 11 and 12 are a representation of two voice ports, X and Y, communicating intranodally. The ports X and Y are assigned partitions P (which is of even value) and P+1 (which is of odd value), respectively. In even numbered scans of the SCM 50, the port X writes into the location P on the A side of the INB 56 and reads from location P of the B side of the INB 56. Similarly, the port Y writes into the P+1 location of the A side of the INB 56 and reads from the P+1 location on the B side of the INB 56. In the following scan of the SCM, the port X writes into the P+1 location on the B side of the INB 56 and reads from the P+1 location on the A side of the INB 56. Similarly, the port Y writes into the P location on the B side of the INB port 56 and reads from the P location on the A side of the INB 56. This alternation between a pair of partitions, as is illustrated in FIGS. 11 and 12, occurs only in the INB 56 and not in the TBB 54 or the RBB 64. In this manner, a local port has access to information placed into the INB 56 in the preceeding SCM scan by another local port with which it is communicating. Thus, a single partition addresss in the SCM 50 indicates where information is to be buffered for transmission either in the INB 56 or the TBB 54 and also where information is to be obtained ftom either the INB 56 or the RBB 64.

The operation of the transmit burst buffer 54 is as follows. All information generated by the ports 21 which is to be sent to the burst modem 24 is accumulated in the TBB 54. The TBB 54 is an A/B buffer with sufficient buffering to retain one channel in the A side and one channel in the B side for a number of voice equivalent ports 21. During one TDMA frame, the A side of the TBB 54 accumulates a channel's worth of information from a number of voice equivalent ports 21. During the same TDMA frame, the B side of the TBB 54 is available for transmission of a channel's worth of information to the burst modem 24. In the next TDMA frame, the roles of the A side and the B side of the TBB 54 are reversed.

As is shown in FIG. 5, the design of the TBB 54 is modular with two TBB units referred to as a storage group, required to support 128 voice-equivalent ports 21 which are destined for transmission to the satellite 5.

An ancillary task performed by the TBB 54 is that of logically ORing together the one byte transmit bus 44a coming from each of the four voice/data boards 27 shown in FIG. 5. A TBB storage group (TBB pair) as is shown in FIG. 5 supports a pair of port boards 27 also shown in FIG. 5.

OVERVIEW OF PORT BURST PRIORITIZATION

Port burst prioritization for a satellite transmission can be described as follows. For a given number of active ports 21, if the port speed were the only consideration, the demand for satellite capacity would determine which channels would be transmitted. However, an additional consideration must be the imposition of voice activity compression (VAC) and data activity compression (DAC) which are employed to identify and preclude from transmission activity which appears to be either unintelligible or redundant in order to minimize the demand for a satellite channel capacity. It should be recognized that the need to compress information only pertains to the satellite traffic since the digital switch 30 is capable of supporting all 384 voice equivalent ports when they operate intranodally. The results of VAC and DAC are only statistically predictive. It is possible, therefore, that at times the number of channels to be sent exceeds the number which have been allocated to the SCC 22. Those voice equivalent ports 21 whose channels of information require satellite transmission but which are not sent, are referred to as having been frozen-out. Because freeze-out is a possibility, the ports 21 are assigned a relative priority in order to assure that information with the highest requirement for integrity is sent first in the TDMA burst.

The SCM 50 identifies a voice-equivalent port 21 and associates it with a particular partition in the TBB 54. A voice-equivalent port 21 is associated with one of three priority levels by means of the port type code stored in byte 2 of the SCM entry corresponding to that port. The SCM 50 scans each of the 384 voice-equivalent ports 60 times in one 15 milliseconds TDMA frame. For each port type, particular scans are employed through the SCM to review the activity of that port type and to form threaded lists of associated partitions in the TBB 54 which contain channels of information to be transmitted to the satellite 5. The order in which the partitions of the TBB 54 appear within a transmit list associated with a particular port type is a function of the order in which the voice-equivalent ports 21 were scanned for activity in the SCM 50.

The order of bursting within a particular transmit list is last in/first out (LIFO). The order of bursting among transmit lists is a function of the port type, that is the relative priority.

Transmit priority levels are denominated 0, 1, 2 and 3. Priority level 0 is the highest priority level and is the level with which signaling information channels which are originated by the SCP 32 are associated. Priority level 1 is the highest port traffic priority level and follows level 0 in the TDMA burst order. Level 1 is the level with which digital data from data ports 16 and 18 having data rates greater than 32 Kbps is associated. It can be appreciated, however, that any port type, voice or digital data, could be placed at the level 1 priority.

An entry is placed in the level 1 transmit list if the level 1 voice-equivalent port has been active any time during the TDMA frame. In order to accomplish this, the activity indication (VAC/DAC) associated with each byte transmitted by each voice equivalent port 21 is logically ANDed with its previous value throughout the frame. (DAC/off is used by digital ports to indicate activity.) This accumulated VAC/DAC indication is examined during the last scan of the TDMA frame (that is scan 60 of the SCM 50). If the VAC/DAC indicator is on (that is no activity indication), no action is taken. If the VAC/DAC indication is off, the identity of the partition in the TBB 54 with which the voice equivalent port 21 is associated is placed in the level 1 transmit list.

The level 2 priority follows the level 1 in burst order and is the level with which voice ports are normally associated. There is evidence which indicates that the loss of speech as the result of freeze-outs early in a talkspurt is subjectively less objectionable to the listener than loss of speech later in a talkspurt. As a result, the level 2 priority contains four priority sublevels based on talkspurt duration. Talkspurts whose durations have exceeded 45 milliseconds are given a higher priority than newer talkspurts in order to bias freeze-outs such that, if they occur, they tend to occur at the beginning of a talkspurt.

The priority sublevels for voice messages is organized so that sublevel 0 is the highest priority within the level 2 priority group. Sublevel 0 corresponds to a talkspurt duration of 45 milliseconds or longer, sublevel 1 corresponds to a talkspurt duration of 30 to 45 milliseconds, sublevel 2 corresponds to a talkspurt duration of 15 to 30 milliseconds and sublevel 3 corresponds to a talkspurt duration shorter than 15 milliseconds.

The level 2 sublevel 0 is referred to as "old voice". The other sublevels are collectively referred to as "new voice." A new talkspurt will progress up through the voice sublevels until it enters the old list where it will remain until the end of the talkspurt.

Priority level 3 is the lowest priority level and is the level to which deferrable data is assigned. Only data ports 14 operating below a 32 Kbps rate can be deferrable. Level 3 is actually composed of four priority sublevels, one for each data speed below 32 Kbps. The sublevel 0 is the highest of the level 3 priority group. Sublevel 0 corresponds to the 19.2 Kbps data port, sublevel 1 corresponds to the 9.6 Kbps data port, sublevel 2 corresponds to the 4.8 Kbps data port, and sublevel 3 corresponds to the 2.4 Kbps data port.

An entry is placed in the appropriate level 3 sublist if the port 14 has been active any time during the TDMA frame. The accumulated VAC/DAC indication provided by the port 14 is used to determine port activity during the last SCM scan of the frame.

A level 3 demand is serviced during that portion of the TDMA burst where surplus channel capacity is available after having serviced priority levels 0, 1 and 2. A level 3 port whose channel has not been transmitted before the beginning of the TDMA frame in which another channel's worth of information is to be developed, is serviced at the level 1 priority. That is, the priority of the channel's worth of information is raised in order to assure that the information is transmitted and the integrity of the communications is maintained.

PORT BURST PRIORITIZATION MECHANISM

FIG. 14 shows a detailed functional block diagram of the burst prioritization mechanism 74 in conjunction with the SCM 50 and the TBB 54. To gain a better appreciation of the part played by the SCM 50 in the formation of burst lists and the transmission of burst lists, the diagram of the SCM organization in FIG. 6 has been redrawn in FIG. 13 to incorporate the function of the six respective bytes in each SCM entry as was described in Tables I and II. The outputs labeled port identification (ID) 78, port type 80, and partition address 82 from the SCM 50 will be employed in the discussion of the operation of the burst prioritization mechanism of FIG. 14. In addition, the slot counter 70, which is a modulo 420 counter, has a first slot count output 75 which goes from 0 to 419 and accesses the correspondingly numbered 0 through 419 entries of the SCM 50. The slot counter 70 has a second output which is the byte scan count 77, which is incremented every time the slot count 75 reaches 419. The byte scan count goes from 0 to 60 and counts the number of bytes per channel's worth of traffic transferred from a given voice-equivalent port 21 to its corresponding TBB partition 54. These outputs will be connected to the burst prioritization mechanism as will now be explained.

The TBB partition addresses from the SCM 50 over line 82 pass through the partition register 102 and into the address register 104 where they are used to address the burst priority RAM 100. Partition addresses which are to be included in a transmit list are transferred from the address register 104 to the data register 106 and from there are written into the burst priority RAM 100 where the ordered lists of partition addresses are formed for use in bursting port traffic to the satellite.

The organization of the burst priority RAM 100 is shown in FIG. 15. It is divided into two identical regions to permit bursting from a transmit list in one region while simultaneously forming a transmit list of the same type in the other region. Each region contains a partition chain area 103 and 103' and an initial pointer area 101 or 101'. The initial pointer area 101, 101' consists of a fixed location initial pointer section 101a and a burst-ordered initial pointer section 101b. Partition addresses are read from the burst priority RAM 100 during the traffic burst and written into the RAM register file 122. From there, they are transferred to the next partition register 124 which is fed to the transmit space signaling buffer 126 for the purpose of obtaining the destination address for the next TBB partition to be burst. The next partition register 124 feeds the TBB address register 128 which is used for addressing the TBB 54 while bursting port traffic over the line 45 to the burst modem interface 36.

BASIC TRANSMIT LIST FORMATION SEQUENCE

Transmit list formation is done in the burst prioritization mechanism of FIG. 14, in synchronism with the scanning by the slot counter 70 of the SCM 50. Transmit lists related to data ports 14, 16 and 18 of a specific speed each require one pass through the SCM 50 for their formation. Transmit lists related to voice ports 20 require two passes through the SCM 50. The basic sequence of steps involved in forming transmit lists in one pass through the SCM 50 is as follows.

1. At the beginning of the scan of the SCM 50, the data register 106 is cleared to 0.
2. As each entry in the SCM 50 is accessed by the SCM slot count 75, the partition address 82 from that entry is loaded into the partition register 102.
3. Each partition address is then transferred from the partition register 102 to the address register 104 with a bit called the "last entry" turned on in the address register 104.
4. A decision is made based on the state of the VAC/DAC bits 85 received from the ports 14, 16, 18 and 20, whether to include this partition address on line 82 in the list being formed. If not, no further action is taken with regard to this partition address. If however the partition is to be included in the list, the contents of the data register 106 is written into the location 103 of the burst priority RAM 100 specified by the partition address in the address register 104, after which the contents of the address register 104 are transferred into the data register 106.
5. Steps 2, 3 and 4 are repeated for each access to the SCM 50 throughout the scan by the SCM slot count 75 from 0 through 419. If a partition address is encountered that causes the burst priority RAM 100 to be written in step 4, then all subsequent transfers to the address register 104 in step 3 will be with the "last entry" bit off.
6. At the end of the scan of the SCM 50 when the SCM slot count 75 has reached a value of 419, the contents of the data register 106 is written into the burst priority RAM 100 in the fixed location initial pointer area 101a, at the appropriate location for the particular list being formed.

As a result of the above sequence, a linked list of partition addresses representing port activity is formed. The list header is contained in the fixed location initial pointer area 101a.

FIG. 16 shows a simple example of a transmit list formed as described above. Partition addresses which have satisfied the conditions for inclusion in the list are assumed to have been encountered during the scan of the SCM 50 in the order 4-10-2-6. When partition address 4 appeared in the address register 104, it caused the cleared data register 106 to be stored at location 4 in the partition chain area 103 of the burst priority RAM 100. This entry is not shown in FIG. 16 since it is not considered to be part of the transmit list. Partition address 4 was then transferred from the address register 104 into the data register 106 with the "last entry" bit on since no previous partition address had caused the burst priority RAM 100 to be written.

Sometime later, when partition address 10 appeared in the address register 104, it caused the contents of the data register 106, that is the partition address 4 with the "last entry" bit on, to be written into location 10 of the burst priority RAM 100. Partition 10 was then transferred from the address register 104 to the data register 106, but this time the "last entry" bit is off. In the same fashion, partition address 2 caused partition address 10 to be stored in location 2, and partition address 6 caused partition address 2 to be stored in location 6.

At the end of the scan of the SCM 50 when the SCM slot count 75 has the value of 419, the contents of the data register 106, containing the partition address 6 with the "last entry" bit off, is stored in the appropriate fixed address initial pointer location 101a of the burst priority RAM 100. That completes the transmit list formation sequence for this particular list.

If there had been only one partition address which satisfied the conditions for inclusion in the list, it would have been stored in the fixed address initial pointer location 101a with the "last entry" on bit on. If there had been no such partition addresses, the cleared data register 106 wound have been stored as the intial pointer. This corresponds to a partition address 0 in the TBB 54 which is an invalid partition address and is recognized as representing an empty list.

During bursting of the transmit list, the order of accessing is shown by the arrows in FIG. 16. The initial pointer serves as the entry point to the list. Each entry provides the address of a partition in a TBB 54 to be burst as well as the pointer to the next partition address in the list. An entry with the "last entry" bit on signifies that the end of the list has been reached.

The elements in the burst prioritization mechanism of FIG. 14 which carry out the decision as to whether a particular port is to be enqueued into a particular burst list will now be described. The operation can be more fully appreciated with reference to FIG. 17 which is a timing diagram for burst list formation and transmission. It will be recalled from the prior discussion of the SCM organization and the operation of the voice ports and digital ports, that each voice port operates at 32 Kbps which produces exactly one channel's worth of 60, eight-bit bytes of information per frame.

The slot counter 70 scans through the SCM 50 at a rate of 60 times per frame, in synchronism with the sampling in the voice ports 20. As long as there is voice activity on a voice port 20 so that the VAC 85 is not on, the burst prioritization mechanism can continuously enqueue 60, eight-bit bytes of information per frame.

In a similar manner, high speed data ports having data rates greater than or equal to 32 Kbps, will be producing at least one channel's worth of 60 eight-bit bytes of data per frame. If the data rate for a particular high speed data port is not an integral multiple of 32 Kbps, it will be recalled that the data port 18 will transmit either N or N-1 channel's worth of information per frame to the digital switch 30 based upon a stored pattern in the data port 18. And that when N-1 channel's worth of information are to be transmitted, the N-th channel's worth of information which is omitted will have substituted for it a DAC bit indication. Thus it can be seen that whenever a particular SCM entry is encountered wherein the port type 80 is indicated as being either voice or high speed data, in the absence of a VAC or DAC indication on line 85, the burst priority RAM 100 can be enabled to enter the partition address for that port into its corresponding burst list.

A different situation is encountered for those data ports which, as was previously described, are low speed, having a data rate which is less than 32 Kbps. These data ports do not develop a channel of information every frame but accumulate a channel's worth of data in the buffer 14' at the data port 14 over a predetermined number of frames and only after that predetermined number of frames will the channel's worth of data be transmitted to the digital switch 30. Thus it is necessary to know in which frame a particular type of low speed data port can be expected to transmit its channel's worth of information to the digital switch 30. Reference should now be made to the SCM organization shown in FIG. 6 and the timing diagram shown in FIG. 17 to better understand the burst list formation operation. As was mentioned before in the discussion of the SCM organization, the SCM has 420 entries numbered from 0 through 419, which are accessed by the slot counter 70 over the SCM slot count line 75. Each one of the 60 scans of the SCM slot count 75 through the SCM 50 will enable each consecutive port 21, identified on line 78 from the SCM 50, to transmit one eight-bit byte of information to the partition address in the TBB 54 indicated on line 82 from the SCM 50. At this point there is no defined burst order for the information which is being stored in the TBB 54. However, the relative priority of the various types of information, that is high speed data, low speed data, voice, etc., which is being stored in the TBB, dictates that some order to imposed upon the bursting of this information to the satellite, so that higher priority information is more certain of being successfully transmitted and lower priority information can be sacrificed, if ncessary. This is accomplished, starting with the 37th scan of the SCM slot count 75 through the SCM 50, that is, when the byte scan count 77 is equal to 37. Beginning with the 37th scan through the SCM 5,the port type indication stored in each entry in the SCM and output over line 80 is examined. Particular scans through the SCM 50 will concentrate on a particular type of port and will pick out those entries in the SCM 50 under examination in that particular scan, and examine those corresponding ports 21 for past and present activity. When voice ports 20 or high speed data ports 18 are being examined, only the past or present activity of that port during the frame will be examined and if activity is indicated, that particular port will have the corresponding TBB partition address enqueued in the burst priority RAM 100. If the particular SCM scan is examining a low speed data port 14, not only will the past or present activity of that port during the frame be examined, but recognition will be made of the frame count for the present frame to determine whether the data port's transmission pattern can be expected to enable the transmission of a channel's worth of data during this frame. The operation continues until the byte scan count 77 has reached 60 at which time the end of the frame has been reached and the burst prioritization mechanism 74 then prepares the heads of the respective burst lists for read-out during the assigned burst time in the next TDMA frame.

FIG. 14 shows the slot counter 70 connected by means of the SCM slot count output 75 to the SCM 50 so as to consecutively address the 420 SCM entries. As an example of burst list formation, assume that the SCM scan count 75 has progressed 41 times through the SCM 50 so that the byte scan count 77 has a value of 41. In accordance with the timing diagram of FIG. 17, during the 41st scan, voice ports 20 will be searched for on the port type output line 80 which is connected from the SCM 50 to the enqueue control read-only storage (ROS) 88. The VAC/DAC line 85 connected from the voice port 20 identified on the port ID line 78, is also input to the enqueue control ROS 88. If the VAC line 85 indicates that the port 20 is active, the enqueue control ROS 88 will output on line 94 an enqueue enable signal which is transmitted over line 136 as a write enable signal to the burst priority RAM 100. The corresponding TBB partition address output on line 82 from the SCM 50 is then input to the partition register 102 and will progress through the address register 104 and the data register 106 so as to be enqueued in a burst list being prepared for this type of voice port 20 in the burst priority RAM 100. After the slot counter 70 has counted through 419 on the SCM slot count 75 during this 41st scan for the byte scan count 77, during which the byte scan count decode ROS 88 has delivered an enabling signal to the burst priority RAM 100, the condition of having reached the end of the 41st scan in the SCM 50 will be indicated over the SCM slot count line 75 to the slot count decode ROS 114. At this juncture, the slot count decode ROS 14 will signal to the list pointer control 112 that the last voice port TBB partition address is to be stored in the burst priority RAM 100 in the fixed location initial pointer address 101a corresponding to this type of voice port, as is indicated by the byte scan count 77 line input to the list pointer control 112. The initial pointer address generated by the list pointer control 112 will be entered through the register file 108 to the address register 104 and the last voice port TBB partition will be stored at that address location in the fixed location initial pointer 101a. That completes the formation of that particular voice port list. If a voice port of that type were active during a portion of the frame but ceased activity or had intermittent activity during the frame, the voice activity memory 96 connected to the enqueue control ROS 88, will have stored the condition that there was activity for that particular voice port at least during some portion of the frame and that will satisfy the condition of port activity during the SCM scan when that type of port is being examined for activity.

A similar operation is carried out for high speed data ports 16 or 18.

When low speed data ports are being examined during the 56th, 57th, or 59th SCM scan as indicated in FIG. 17, recognition must be taken of the particular frame count for the present frame since, as is shown in Table III, low speed data ports transmit their channel's worth of information only during certain predetermined frames in a 40 frame period of time. The frame count is input on line 91 to the low speed data control ROS 90 which also has an input on the line 80' for low speed data port types which comes from the SCM entry for that particular port 14. When the byte scan count 77 from the slot counter 70 indicates to the byte scan count decode ROS 86 that the 56th through 59th SCM scan is presently underway, indicating that a particular type of low speed data port is under investigation, then the enqueue control ROS 88 will require that the output from the low speed data control ROS 90 indicate that the desied frame count for the particular port type under investigation, be present before an equeue enable signal on line 94 will be issued. When this circumstance obtains, then the enqueuing of that particular low speed data port's TBB partition address in the burst priority RAM 100 will be carried out as has been previously described for voice ports 20 and high speed data ports 18.

At the end of the 60th scan through the SCM when the present frame has ended, the burst prioritization mechanism 74 will reorder the initial pointers from the fixed location area 101a into a new order stored in the burst ordered initial pointer area 101b. It will then fetch the highest priority initial pointer from the burst ordered initial pointer list 101b in the burst priority RAM 100 and load it into the RAM register file 122 and from this point on, every 14th SCM update entry slot shown in FIG. 6 will be used to access the burst priority RAM 100 to fetch the next list entry for bursting when the timing and acquisition controls 34 signal the burst prioritization mechanism 74 to commence the burst transmission to the satellite. This will be further described later. At this point, a more detailed description of the particular operation of the burst prioritization mechanism will be made for carrying out the formation of voice port transmit lists, low speed data transmit lists, and high speed data transmit lists.

VOICE PORT BURST LIST FORMATION

The elements shown in the detailed diagram of FIG. 14 enable the feature of dynamically varying the priority of voice ports 20 in accordance with the age of their yet to be transmitted talkspurts and dynamically varying the priority of low speed data ports 14 whose stored channels of information have beeen deferred from transmission until such deferral can no longer be maintained and immediate transmission becomes critical.

Dynamically variable priority for voice messages is achieved by including in the burst priority RAM 100 a section 98 which constitutes an additional three bits of information stored along with the enqueued tBB partition address, which is the voice history code of activity for a particular voice port 20. The dynamic variation of voice priority is carried out by the double scan for each voice port during the 37th-39th SCM scans as was referred to above, passing the voice history code over line 134 from section 98 of the burst priority RAM 100 to the voice control 116 where it is updated as will be next described and then the updated code is output over the line 119 back to the voice history code section 98 of the burst priority RAM 100. A write enable signal is transmitted from the voice control 116 over the line 136 and through the OR gate 135 to the write enable line 136 as an input to the burst priority RAM 100, enabling the writing of the updated voice history code into section 98. The voice history code stored in the burst priority RAM 100 is associated with each voice port 20 partition address. The priority code designations are sublevel 0, 1, 2, 3 and no activity. During each frame, the voice port transmit list formation begins when a sample of the VAC bit from each voice port is taken during the 37th SCM scan. The voice history code for each associated partition address is updated in the voice control 116 on the basis of this VAC sample and the voice history code from the previous frame as follows. If the VAC sample for a voice port is on, then any old priority code for that port will be updated as no activity. When the VAC sample for a voice port is off, an old priority code for that voice port of sublevel 3 will be updated to a new sublevel 2, old sublevel 2 will be updated to a new sublevel 1, old sublevel 1 will be updated to a new sublevel 0, and old sublevel 0 will continue to be a new sublevel 0. This priority code update operation takes place over a two scan interval during the 37th through 39th SCM scans for all of the voice ports 20.

A two scan interval during the 41st through 43rd SCM scans is used to form a transmit list of partition addresses of voice ports having a sublevel 2 priority code. Similarly, a two scan interval during the 45th through 47th and the 49th through 51st SCM scans are used to form transmit lists of partition addresses of voice ports having sublevel 1 and sublevel 0 priority codes, respectively.

These lists are linked together by omitting the reset of the data register 106 at the beginning of the second and third voice port list formation sequences. Thus, the initial pointer stored at the end of the third sequence provides entry into the sublevel 0 transmit list, the last entry of which points to the first entry in the sublevel 1 transmit list, the last entry of which in turn points to the first entry in the sublevel 2 transmit list. Entries in the voice port sublevel 0 transmit list are characterized by turning on an additional bit in the burst priority RAM 100 which is used later in freeze-out counting, since only sublevel 0 voice effects the freeze-out statistics.

During the 53rd SCM scan, another sample of the VAC bit from each voice port is taken. A two scan interval during the 53rd through 55th SCM scans is used to form the sublevel 3 voice port transmit list and to update the voice history code for those partition addresses included in the list. Partition addresses for which the voice history code records no activity and the VAC bit sample indicates that the VAC is off, (recent activity) are indicated in the list and the voice history code is updated to a sublevel 3.

Thus, during each frame, two voice initial pointers are stored in the fixed location initial pointer area 101a of the burst priority RAM 100. One, the high priority voice initial pointer provides entry into the lists of sublevels 0 through 2. In the other, the low priority voice initial pointer, provides entry into the sublevel 3 list.

All voice port transmit list formation operations require two complete scans of the SCM. This is because the burst priority RAM 100, which operates with the same access rate as the SCM 50, must first be read for each voice partition address in order to obtain the current voice history code and then possibly be rewritten to update the voice history code and/or enter the partition address in a transmit list. This is accomplished by alternating between periods in which only odd SCM locations are serviced and periods when only even SCM locations are serviced, with two consecutive burst priority RAM cycles being furnished to each SCM location serviced. The use is made of the time provided by the six SCM status slots described above, for switching back and forth between these two modes of operation. Thus, half the SCM entries are serviced during the first scan of the SCM 50 and the other during the second scan.

Detailed Description of the Voice Control

Figure 20A:
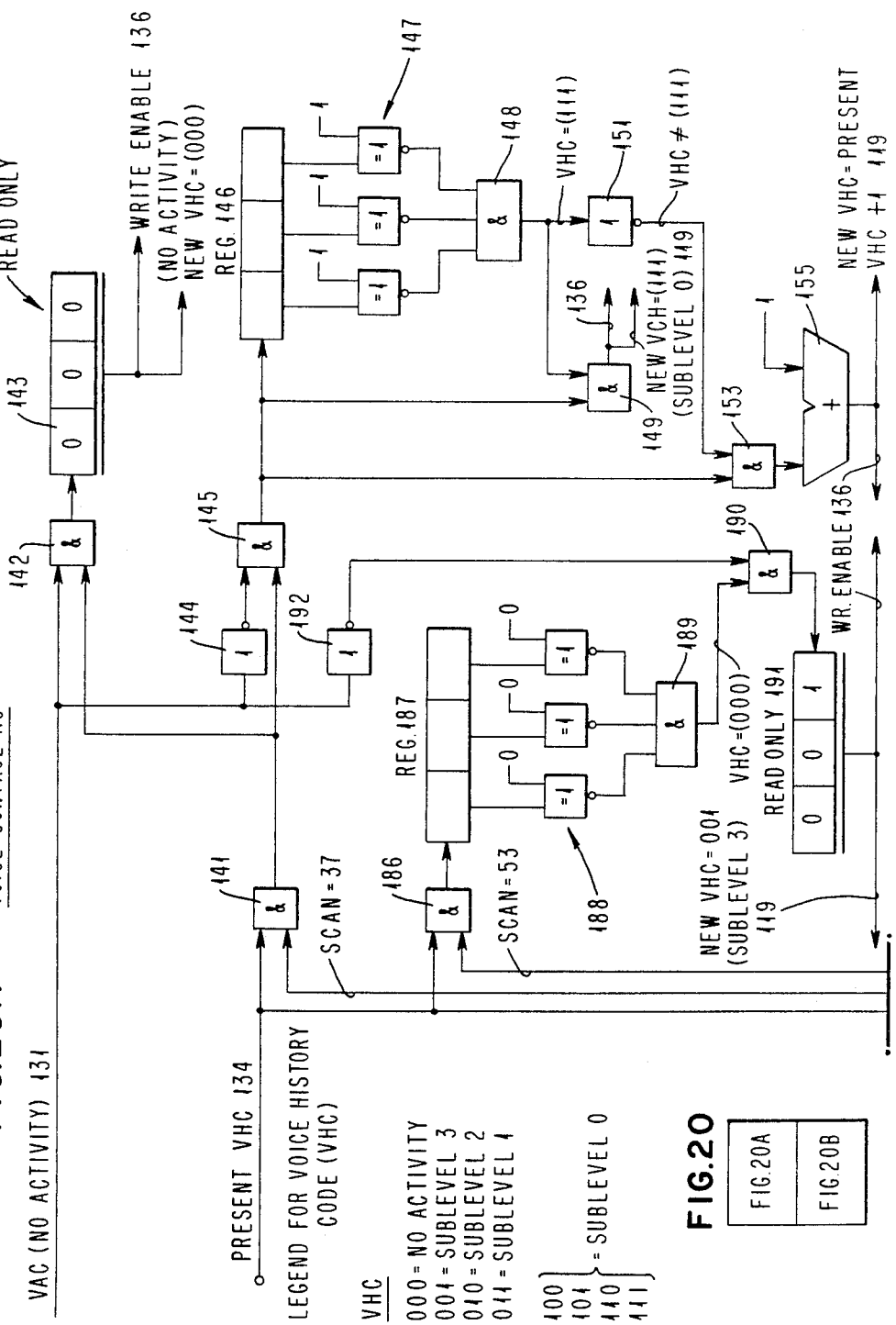
Figure 20:
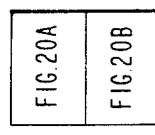

The voice control 116, which is shown in detail in FIG. 20, carries out the operations of sampling the voice ports for activity during the 37th through 39th SCM scans and updating the voice port priority codes, which are also called the voice history code (VHC). As was mentioned before, the voice history code is a three bit code stored in section 98 of the burst priority RAM 10, with one voice history code associated with the TBB address stored in the burst priority RAM 100 for each voice port 20. The three binary bit code for the voice history code has the following significance. The code 000 corresponds to there having been no activity for the corresponding port in the present frame. The code 001 corresponds to a sublevel 3, the code 010 corresponds to a sublevel 2 and the code 011 corresponds to a sublevel 1, as previously defined. The codes 100, 101, 110, and 111 correspond to the sublevel 0 as previously defined.

In discussing the voice control functional block diagram of FIG. 20, it is convenient to refer to Table IV which shows three different example voice ports and their respective status, voice history code and burst list to which they are assigned over consecutive frames numbered from 0 through 8. The voice port 1 has its status as being inactive or off throughout frames numbered 0 through 8. The voice port 2 has its status as being off in frame number 0 and then being on or active in frames numbered 1 through 8. The voice port 3 has its status as being on in frame numbers 0 and 1 and then being off or inactive in frames numbered 2, 3 and 4 and then its status being on or once again active in frame numbers 5 through 8.

The voice control fucntional block diagram of FIG. 20 carries out the operations of sampling the voice ports during the 37th SCM scan to update the voice port voice history codes. The voice control 116 also carries out the function of forming the voice port sublevel 2 list in the 41st scan, the voice port sublevel 1 list in the 45th SCM scan, and the voice port sublevel 0 list in the 49th SCM scan. The voice control 116 also has the function of sampling the activity of any previously inactive voice ports during the 53rd scan and updating those voice ports to sublevel 3 which show some activity in the present frame which commenced after the initial voice port sampling in the 37th SCM scan. The voice control 116 then forms the voice port sublevel 3 list during the 54th SCM scan. These operations are carried out by the apparatus shown in FIG. 20, as follows.

The byte scan count decoder 140 decodes the byte scan count 77 at its input and issues enabling pulses when the byte scan count has a value of 37, 41, 45, 49, 53 and 54. Whenever one of these enabling signals is output from the byte scan counte decoder 140, the OR gate 137 is satisfied and provides an enabling signal to the AND gate 139 whose other input is connected by line 132 to the enqueue control ROS 88 to indicate if the present slot accessed in the SCM 50 corresponds to a voice type port. Every time a voice type port is indicated by the enqueue control ROS 88, the AND gate 139 issues a read enable signal on line 172 to the burst priority RAM 100 so that the TBB partition address on line 82 from the SCM 50 in the slot thus accessed, is used as the address to access the voice history code stored in section 98 of the burst priority RAM 100. The three binary bit voice history code is accessed from section 98 of the burst priority RAM 100 and output over line 134 to the voice control 116.

When the SCM scan value is 37, the byte scan count decoder 140 issues an enabling signal to the AND gate 141, whose other input is connected to the line 134 which delivers the present voice history code from the burst priority RAM 100. If the VAC line 131 indicates there is no activity in the voice port whose slot has been accessed from the SCM 50, the AND gate 142 is satisfied and its output signal enables the read-only register 143 to issue a new voice history code 000 which corresponds to no activity, over line 119 to the input of section 98 of the burst priority RAM 100. The output of the read-only register 143 also issues a write enable signal on line 136 to the burst priority RAM 100. The new voice history code is written into area 98 of the burst priority RAM 100 at the address indicated by the TBB partition address for the voice port output on line 82 from the SCM 50.

If the VAC line 131 indicated that there was activity at some time during the present frame on or before scan 37, the inverter 144 would issue an enabling signal to the AND gate 145 which would transfer the present voice history code on line 134 into the register 146 with the low order bits on the right-hand and the high order bits on the left-hand end in FIG. 20. The exclusive OR gates 147 compare the voice history code in register 146 with the binary value 111 to determine whether the present voice history code is a sublevel 0 code of 111. This is achieved by the outputs of the exclusive ORs 147 being inverted and input to the AND gate 148. The AND gate 148 outputs an enabling signal to the AND gate 149 when the voice history code value is 111 and the AND gate 149, whose other input is connected to the output of the AND gate 145, transmit the present voice history code value of 111 over the line 119 to the burst priority RAM 100. The AND gate 149 also issues a write enable signal over the line 136 to the burst priority RAM 100. This corresponds to a circumstance for a voice port 3 during frame number 1 since its voice history code remains 111, the same code as was used in frame 0, as is shown in Table IV.

If the present voice history code input on line 134 is not 111, then the AND gate 149 is not enabled and the inverter 151 outputs an enabling signal to the AND gate 153 whose other input is connected to the output of the AND gate 145 so as to pass the present voice history code value on line 134 to one input of the binary adder 155. The binary adder 155 adds the binary value of one to the present voice history code output from the AND gate 153 and outputs this incremented voice history code as the new voice history code on line 119 to be written into section 98 of the burst priority RAM 100. The output from the adder 155 also provides a write enable signal on line 136 to the burst priority RAM 100. This corresponds to the operation shown for voice ports 2 in Table IV where in frame number 2, the present voice history code was 001 corresponding to a sublevel 3 priority and the binary adder 155 incremented the voice history code of voice port 2 in frame 2 to a code 010 which corresponds to a sublevel 2 priority.

After all of the voice ports have had their SCM slots accessed from the SCM 50 during the scan number 37 so as to have their voice history codes stored in section 98 of the burst priority RAM 100 updated in accordance with their activity, the scanning of the SCM continues.

When scan 41 of the SCM is reached, the byte scan count decoder 140 outputs an enabling signal to the AND gate 157, the other input of which is connected to the voice history code line 134 which will transmit all of the updated voice history codes stored in section 98 of the burst priority RAM 100 to the register 159 for comparison by the exclusive ORs 161 with the code 010 corresponding to sublevel 2. Whenever a voice history code in register 159 has a code 010, the AND gate 163 is satisfied and outputs an enabling signal on line 136 to indicate to the burst priority RAM 100 to write the TBB partition address output on line 82 from the SCM 50 into the sublevel 2 list now being formed in the burst priority RAM 100. All of the slots in the SCM 50 which correspond to voice ports 20 have their voice history codes compared by the exclusive ORs 161 so that all sublevel 2 voice ports are enqueued in the sublevel 2 list in the burst priority RAM during this frame. This corresponds to voice port 2 in Table IV during frame number 2 where the updated voice history code is 010 and the voice control 116 causes the TBB partition address for voice port 2 to be enqueued in the sublevel 2 list during scan 41 of the SCM 50.

During scan 45 of the SCM 50, the byte scan count decoder 140 outputs an enabling signal to the AND gate 165 whose other input is connected to the voice history code line 134 which transmits updated voice history codes for all of the voice ports to the register 167 for comparison with the voice history code 011 by the exclusive ORs 169. When a particular voice port history code in register 167 has a code 011, the AND gate 171 is satisfied and outputs an enabling signal on line 136 which commands the burst priority RAM 100 to write that voice port's TBB partition address into the sublevel 1 list now being formed in the burst priority RAM 100. This corresponds to voice port 2 in Table IV during frame number 3 wherein the updated voice history code is 011 and thus the TBB partition address corresponding to voice port 2 is enqueued in the sublevel 1 list now being compiled in the burst priority RAM 100.

When the SCM scan count achieves a value of 49, the byte scan count decoder 140 outputs an enabling signal to the AND gate 173, whose other input is connected to the voice history code line 134 and transmits the updated voice history code for all of the voice ports whose slots are accessed from the SCM 50, to the register 175, where the voice history codes are compared with the high order bit value of 1 in the exclusive OR gate 177. The sublevel 0 voice ports all have their high order binary bit equal to 1 and therefore when a voice port whose voice history code has a high order bit of 1 is loaded into the register 175, the exclusive OR gate 177 is not satisfied and inverter 177a outputs an enabling signal over line 136 to a burst priority RAM instructing it to write the TBB partition address which was accessed on line 82 from the SCM 50, corresponding to the voice port, into the sublevel 0 list now being formed in the burst priority RAM 100. This corresponds to voice port 2 during frame number 4 through 8 where the high order bit for the voice history code has a value of one, as for example, in frame 4 the voice history code is 100, and thus the TBB partition address for voice port 2 will be enqueued into the sublevel 0 list during this frame.

As the SCM scan count continues to increase, and achieves a value of 53, the byte scan count decoder 140 outputs an enabling signal to the AND gate 186, whose other input is connected to the voice history code line 134. During scan 53 of the SCM 50, all voice ports are again reviewed to determine whether any voice port having no previous activity during this frame, with a voice history code of 000, now has some activity and therefore should be included in the sublevel 3 list. When the AND gate 186 is satisfied, it transfers the present voice history code on line 134 into the register 187 for comparison with the code 000 by the exclusive ORs 188. When a voice history code 000 is loaded into the register 187, the AND gate 189 issues an enabling signal to the AND gate 190, whose other input is connected through the inverter 192 to the VAC line 131. If there has been any activity for the voice port now under consideration, the inverter 192 will issue an enabling signal to the AND gate 190 which, when satisfied, issues an enabling signal to the read-only register 191 code loaded into the register 181 is 001, the inverted outputs of the exclusive OR gates 183 satisfy the AND gate 185 which issues an enabling signal over line 136 to the burst priority RAM 100 commanding it to write the TBB partition address for the voice port under consideration to the sublevel 3 list now being compiled in the burst priority RAM 100. This corresponds to voice port 3 during the fifth frame in Table IV where the voice history code of 001 causes the TBB partition address for voice port 3 to be enqueued into sublevel 3 list being compiled in the burst priority RAM 100. Thus it is seen how the voice control 116 can change the relative priority of voice ports 20 in accordance with the duration of their talkspurts, so as to change the order in which information from those voice ports is burst from the earth station to the satellite.

TABLE IV

|  |  | Frame Number (15 ms/Frame) | | | | | | | | |
|---|---|---|---|---|---|---|---|---|---|---|
|  |  | 0 | 1 | 2 | 3 | 4 | 5 | 6 | 7 | 8 |
| Voice Port 1 | Status | Off | Off | Off | Off | Off | Off | Off | Off | Off |
|  | VHC | 000 | 000 | 000 | 000 | 000 | 000 | 000 | 000 | 000 |
|  | List | None | None | None | None | None | None | None | None | None |
| Voice Port 2 | Status | Off | On | On | On | On | On | On | On | On |
|  | VHC | 000 | 001 | 010 | 011 | 100 | 101 | 110 | 111 | 111 |
|  | List | None | $V_3$ | $V_2$ | $V_1$ | $V_0$ | $V_0$ | $V_0$ | $V_0$ | $V_0$ |
| Voice Port 3 | Status | On | On | Off | Off | Off | On | On | On | On |
|  | VHC | 111 | 111 | 000 | 000 | 000 | 001 | 010 | 011 | 100 |
|  | List | $V_0$ | $V_0$ | None | None | None | $V_3$ | $V_2$ | $V_1$ | $V_0$ | which stores the binary value 001. The code 001 is then output from the read-only register 191 over the line 119 to the section 98 of the burst priority RAM 100 indicating that the present voice port under consideration should have its voice history code updated to a sublevel 3 status. The output from the read-only register 191 also provides a write enable signal to the burst priority RAM 100. This would correspond, for example, to voice port 3 in Table IV during the fifth frame, where for example the VAC line 131 originally indicated no activity during the 37th SCM scan but now indicates voice port activity during the 53rd SCM scan. Thus the voice history code for voice port 3 during the fifth frame in Table IV is updated from 000 to 001 and the updated voice history code is stored in section 98 of the burst priority RAM 100.

The SCM scan continues to increment and when it achieves the value of 54, the byte scan count decoder 140 outputs an enabling signal to the AND gate 179 whose other input is connected to the updated voice history code line 134 so as to transfer the voice history codes for all of the voice ports whose slots are accessed from the SCM 50, into the register 181, for comparison in the exclusive OR gates 183 with the code 001 corresponding to a sublevel 3 status. When a voice history

ROTATION OF THE VOICE PORT BURST ORDER TO REDUCE FREEZE-OUT EFFECTS

The relative priorities among voice ports 20 in each priority sublevel are varied over 12 frames and this results in a distribution of the effects of voice freeze-outs among the voice ports. The entries in the SCM 50 which are serviced by the burst prioritization mechanism 74 during the first scan of the SCM 50 in one frame are serviced during the second scan of the SCM 50 during the next frame, and vice versa. Also, the SCM address at which the two scan intervals for transmit list formation begins is changed every other frame. Six different starting addresses, corresponding to the first locations in each of the six voice port regions in the SCM, are used. Table V shows this 12-frame cycle of variation of priority within each voice priority sublevel as a function of the port number and the associated SCM slot location. Even numbered ports in odd SCM slots and odd numbered ports in even SCM slots have a 12-frame priority pattern of 1-8-2-9-3-10-4-11-5-12-6-7 where 1 is the highest priority and 12 is the lowest priority. Odd numbered ports in odd SCM slots and even numbered ports in even SCM slots have a 12-frame priority pattern of 1-7-2-8-3-9-4-10-5-11-6-12.

TABLE V

| Table Entry Definition: (Voice Port Number) -Even/Odd SCM Slot) | | | | | | | | | | | | | |
|---|---|---|---|---|---|---|---|---|---|---|---|---|---|
| | Frame | | | | | | | | | | | | |
| | 1 | 2 | 3 | 4 | 5 | 6 | 7 | 8 | 9 | 10 | 11 | 12 | |
| First | 0-O | 0-E | 1-E | 1-O | 2-O | 2-E | 3-E | 3-O | 4-O | 4-E | 5-E | 5-O | Low |
| | 1-E | 1-O | 2-O | 2-E | 3-E | 3-O | 4-O | 4-E | 5-E | 5-O | 0-O | 0-E | |
| | 2-O | 2-E | 3-E | 3-O | 4-O | 4-E | 5-E | 5-O | 0-O | 0-E | 1-E | 1-O | |
| | 3-E | 3-O | 4-O | 4-E | 5-E | 5-O | 0-O | 0-E | 1-E | 1-O | 2-O | 2-E | |
| Enqueue Order | 4-O | 4-E | 5-E | 5-O | 0-O | 0-E | 1-E | 1-O | 2-O | 2-E | 3-E | 3-O | Priority |
| | 5E | 5O | 0-O | 0-E | 1-E | 1-O | 2-O | 2-E | 3-E | 3-O | 4-O | 4-E | |
| | 0-E | 0-O | 1-O | 1-E | 2-E | 2-O | 3-O | 3-E | 4-E | 4-O | 5-0 | 5-E | |
| | 1-O | 1-E | 2-E | 2-O | 3-O | 3-E | 4-E | 4-O | 5-O | 5-E | 0-E | 0-O | |
| | 2-E | 2-O | 3-O | 3-E | 4-E | 4-O | 5-O | 5-E | 0-E | 0-O | 1-O | 1-E | |

TABLE V-continued

Table Entry Definition: (Voice Port Number)
-Even/Odd SCM Slot)

|  | Frame | | | | | | | | | | | | |
|---|---|---|---|---|---|---|---|---|---|---|---|---|---|
|  | 1 | 2 | 3 | 4 | 5 | 6 | 7 | 8 | 9 | 10 | 11 | 12 | |
|  | 3-O | 3-E | 4-E | 4-O | 5-O | 5-E | 0-E | 0-O | 1-O | 1-E | 2-E | 2-O | |
|  | 4-E | 4-O | 5-O | 5-E | 0-E | 0-O | 1-O | 1-E | 2-E | 2-O | 3-O | 3-E | |
| Last | 5-O | 5-E | 0-E | 0-O | 1-O | 1-E | 2-E | 2-O | 3-O | 3-E | 4-E | 4-O | High |

LOW SPEED DATA PORT BURST LIST FORMATION

Data ports 14 operating at 2.4 Kbps, 4.8 Kbps, 9.6 Kbps and 19.2 Kbps do not produce a channel's worth of information every frame, as can be seen from Table III and the previous discussion, and thus do not require transmission to the satellite every frame. Because of this characteristic, efficiency in the use of the assigned satellite bandwidth may be increased by placing these ports in a deferrable mode. Deferrable mode operation is basically as follows:

1. The data port 14 transfers a channel's worth of information to the TBB 54 during one of the frames so designated in Table III. If a DAC bit presented by the data port is turned off at any point in this frame, it will remain off until the end of the frame, indicating that some activity was present at the port during the frame.
2. The burst prioritization mechanism enters the data ports' partition address in the appropriate deferrable data transmit list in the burst priority RAM 100 if the DAC bit presented by the data port is off.
3. In the following frame the port retransfers the same channel's worth of information to the TBB 54, thus providing copies of the channel in both the A part of the TBB and the B part of the TBB, as was described above. An exception of this occurs every fifth frame for the 19.2 Kbps ports which transfer a new channel to the TBB 54 rather than a repeat of the channel transferred in the previous frame.
4. In this following frame also, the burst prioritization mechanism begins to use, at low priority, the transmit list formed in the previous frame for transmission to the satellite from the TBB loaded in the previous frame.
5. In all subsequent frames, until the last frame involving the transfer of a new channel to the TBB 54, the data port 14 prevents the TBB 54 from being written into at its corresponding partition address and the burst prioritization mechanism continues using the same transmit list at low priority.
6. During the next frame in which the data port 14 transfers a new channel of information to the corresponding partition address in the TBB 54, the burst prioritization mechanism elevates the old transmit list containing the remaining portion of the deferred data ports which have not yet been transmitted, to a higher priority, bursting from the opposite side of the TBB 54 to that side which is being loaded by the data port 14.
7. At the SCC 22 at the receiving earth station, the receiving data port 14 must be capable of handling the channel's worth of information whether it is transmitted at the earliest opportunity or at the latest. The receiving data port 14 accomplishes this by holding the channel's worth of information in a buffer 14" at the time of its receipt until the occurrence of the frame after the latest one possible, at which time it starts unloading the buffer.

The dynamically variable priority feature of the low speed data ports is carried out by the elements shown in the detailed diagram of FIG. 14. In particular, the low speed data priority ROS 120 has as an input, the frame count 91 and the port type 81'. After burst list formation has taken place during a particular frame and the 60th SCM scan has been completed, the fixed location initial pointers in section 101a of the burst priority RAM 100 are updated based on the traffic burst in the previous frame, under the control of the list pointer control 112. As each deferred data port list is reviewed in this updating operation, the low speed data priority ROS 120 compared the frame count 91 to the latest frame during which the deferred must be burst before it is lost. If that latest frame has occurred, then the relative priority of the low speed data port list under examination is increased so as to be equivalent to the high speed data port priority and that list will be placed in the burst ordered initial pointer area 101b just behind the high speed data list for bursting during the next frame.

In particular, the 2.4K deferrable data transmit list is formed during the 56th SCM scan at each frame in which 2.4K data ports produce their channels. Entries in this list are partition addresses associated with the SCM entries wherein the data port type is 2.4K deferrable data and the internodal bit is on and the DAC bit presented by the port during the 56th SCM scan is off. During the 60th and last SCM scan of each of these frames, a bit in the port activity memory 96 is turned on for each 2.4K data port presenting a DAC bit off but which was not included in the list formed in the 56th SCM scan. These bits then identify those 2.4K partitions in the TBB 54 containing information that should be transmitted to the satellite, but for which the DAC-off activity was not detected until after the 56th byte of the channel. These partition addresses are included in a transmit list formed during the 56th SCM scan of the following frame, called the 2.4K residual list. It is formed in the same manner as the 2.4K primary list except the bit in the port activity memory 96 is used instead of the DAC bit from the port 14.

4.8 Kbps deferrable data transmit lists are formed in a fashion identical to that for the 2.4K lists except that the 57th SCM scan is used to form the lists. Thus the 4.8K residual list represents channels in which the DAC-off activity was not detected until after the 57th byte.

9.6 Kbps deferrable data transmit lists are formed in a fashion identical to that for the 2.4K list except that the 58th SCM scan is used to form the list. Thus the 9.6K residual list represents channels in which the DAC-off activity was not detected until after the 58th byte.

19.2K deferrable data transmit lists are formed in each of the frames 0 and 2 in Table III. The list formed in frame 0 is used at low priority in frame 1 and at high priority in frame 2. The list formed in frame 2 is used at low priority in frame 3 and at high priority in frame 4.

The 59th SCM scan is used to form those lists of partition addresses wherein the data port type is 19.2K deferrable data and the internodal bit is on, and the DAC bit presented by the data port is off. Ports not indicating DAC-off until the 60th SCM scan are flagged in the port activity memory 96 and included in the non-deferrable data transmit list in the following frame, since no deferring will be possible for these ports. Similarly, in frame 4 of Table III, the channels produced by the 19.2K ports are not deferrable since a new channel is produced again in frame 5. Thus, in frame 4, a 19.2K deferrable data transmit list is ot formed but rather, 19.2K ports indicating DAC-off for the 60th SCM scan are entered into the non-deferrable data transmit list along with the ports defined as non-deferrable or high speed data ports in the SCM.

High speed or non-deferrable data transmit lists are formed in the 60th and last SCM scan of each frame. Partition addresses associated with SCM entries wherein the port type is non-deferrable and the internodal bit is on, and the DAC bit presented by the port was off any time during the frame, are always included in this list. In addition, 19.2K partition addresses for which deferring is impossible are included in this list as discussed above.

Traffic Bursting from Transmit Lists

The following sequence of operations is performed by the burst prioritization mechanism each frame. The order given below is that actually used, starting at the beginning of the frame. The first two operations take place during the first 10½ channels of the frame during which no traffic bursting may occur.
1. Updata fixed location initial pointers 101a based on traffic bursts in the previous frame under the control of the pointer control 112.
2. Order initial pointers by priority in burst ordered initial pointer lists 101b for traffic bursting in current frame under the control of the pointer control 112 and the low speed data priority ROS 120.
3. Count freeze-outs based on traffic bursting in previous frame.

Supply partition addresses from the birst priority RAM 100 under the control of the pointer control 112, as initiated by the request on line 138 from the timing and acquisition mechanism 34 to burst the next channel partition from the TBB 54. This initiates the bursting of traffic using the burst ordered initial pointers and their associated transmit lists in the burst priority RAM 100.

Each of these operations is discussed below, but in a different order than given for reasons of clarity.

The burst ordering of initial pointers occurs at the beginning of each frame, the set of initial pointers existing in the fixed location initial pointer area 101a of the burst priority RAM 100 which represents the transmit list which should be considered for use in bursting in the current frame. These initial pointers are examined for validity, and if valid, placed in the burst ordered initial pointer list 101b, according to their respective priorities in the frame, along with an identification of the initial pointer. An invalid initial pointer which is all zeros, is stored as the last entry in this list.

The ordering of which the initial pointers are examined and placed in the burst ordered initial pointer list 101b is as follows:
1. Non-deferrable data
2. Deferrable data when no longer deferrable
3. High priority voice
4. Low priority voice
5. Deferrable data when deferrable The deferrable data initial pointers are examined in the order of 19.2K, 9.6K, 4.8K and 4.2K. The primary list is examined before the residual list for each respective speed.

TRAFFIC BURSTING

In preparation for traffic bursting, the burst prioritization mechanism 74 fetches the highest priority initial pointer from the burst ordered initial pointer list 101b under control of the pointer control 112 and the register file 108, and loads the pointer in the address register 104. When the timing and acquisition mechanism 34 transmits signal over the line 138 requesting the burst of the first channel partition from the TBB 54, the pointer control 112 responds by executing an access to the burst priority RAM 100 on every 14th SCM slot as determined by the slot count decode ROS 114. This corresponds to the location of the update slots as is seen FIG. 6 for the SCM organization. This access fetches the next list entry from the burst priority RAM 100 for bursting and loads that list entry into the RAM register file 122. Two locations in the RAM register file 122 are used for this purpose with one holding the entry used to access the list and the other being loaded with the entry thus accessed. The roles of these file locations reverse as each entry is used for bursting.

During traffic bursting, the timing and acquisition mechanism 34 repeatedly issues a next partition request on line 138 to the burst prioritization mechanism 74. Each "next partition request" causes the appropriate RAM register file 122 location to be loaded into the next partition register 124 as well as a reversal of the roles of the RAM register file 122 locations. Thus, during the next SCM update slot, which is approximately 8 microseconds after the previous SCM updte slot, the next element in the partition address list will be fetched and loaded into the RAM register file 122 in preparation for being transferred to the next partition register 124 when the next partition address is requested. The next partition address should be requested approximately 12 microseconds after the previous address, and it is therefore seen that the SCM scanning operation passes through SCM update entry points at a faster rate than the rate at which requests are received from the timing and acquisition area 34 for new TBB partitions to be transmitted.

When an entry is encountered in the burst priority RAM 100 having the "last entry" bit on, that entry is not used for accessing a next entry, but rather the next initial pointer in the burst ordered initial pointer list 101b is accessed. When an invalid initial pointer is encountered in the next partition register 124, as will occur when the transmit lists have been exhausted in the burst priority RAM 100, the next partition register 124 is locked in that state for the remainder of the frame. The burst control area in the timing and acquistion mechanism 34, in turn, causes no channels to be burst when it is presented with an invalid partition address.

At the end of each frame, the partition address in the RAM register file 122 that would have been used next for bursting, had the bursting continued, is stored as the new fixed location initial pointer in area 101a for the transmit list in use when the bursting stopped. Invalid partition addresses are stored as the fixed location initial pointers in area 101a for the transmit lists which were exhausted during the traffic burst.

DETAILED DESCRIPTION OF THE LIST POINTER CONTROL

A more complete understanding of the operation of manipulating the list pointers during the burst list formation stage, during the burst list reordering stage and during the burst list transmission stage can be had by referring to FIG. 18 which is a detailed functional block diagram of the list pointer control 112. As is previously described, as particular SCM scans are achieved during a frame, as indicated by the byte scan count 77, each type of port having activity during the frame has its corresponding TBB partition address enqueued in the burst priority RAM 100. For example, during SCM scan 41, the voice priority sublevel 2 ports are enqueued and when the SCM slot count as indicated on line 75 achieves a value of 419, indicating the completion of the 41st scan, the byte scan decoder 150 in the list pointer control 112 of FIG. 18 outputs an enabling signal to the fixed location address store 162 which issues the fixed location address in the fixed location initial pointer area 101a of the burst priority RAM 100 which will be the location for storge of the pointer address for the sublevel 2 voice list. This fixed location address issued from the store 162 is input to the initial pointer address register 108 which, in turn, accesses the burst priority RAM. The presence of an output from the fixed location address store 162 also provides an enabling signal to the AND 166, the other input to which is a signal from the byte scan decoder through the inverter 164 indicating that the present scan is not the 0-th scan for the frame. With the AND 166 thus satisfied, a write enable signal 136 is output to the burst priority RAM 100 so that the contents of the data register 106 containing the TBB partition address of the last sublevel 2 voice port in the list will be written into the fixed location initial pointer area 101a in the permanent location indicated by the fixed location address store 162.

As the byte scan count 77 continues to increase during the present frame, scan values of 45, 49, and 53 respectively initiate similar operations for voice sublevels 1, 0 and 3. As the byte scan count 77 continues to increase the present frame achieving the values of 56, 57, 58, 59 and 60, similar operations respectively take place for the 2.4K, 4.8K, 9.6K, and 19.2K data ports and the high speed data ports.

At the beginning of the next TDMA frame, the byte scan count 77 is at zero and for the first 125 microseconds, there will be no possibility of bursting the contents of the transmit burst buffer 54 since during this period, only control information is being transmitted in the frame. Thus, as was explained before, while the slot count 75 is increasing during the 0-th SCM scan, use can be made of the SCM update slots occurring at every 14th SCM slot location, to reorder the initial pointers from the fixed location initial pointer area 101a to the burst ordered initial pointer area 101b of the burst priority RAM 100. Since the SCM scanning operation encounters an SCM update slot at approximately every 8 microseconds, there is enough time to prioritize 16 different initial pointers before the TBB 54 may be called upon to burst its contents to the satellite.

The burst reordering operation can be understood by reviewing FIG. 18 in conjunction with the schematic illustration of the fixed location initial pointer area 101a and the burst ordered initial pointer area 101b shown in FIG. 19. The fixed location initial pointer area 101a shown in FIG. 19 contains the TBB partition addresses for the last enqueued port in each respective list and the location of those initial pointers is always the same in the fixed location initial pointer area 101a. This was dictated by the fixed address values stored in the fixed location address store 162, whose operation was previously discussed. When the byte scan count 77 has a value of zero, the byte scan decoder 150 provides a first enabling signal to the AND gate 152, whose second input is connected to an output from the slot count decode ROS 114 which supplies a signal for values of the slot count modulo 14. The AND 152 is satisfied whenever the scan counter 0 and the slot count has a value modulo 14 and the output of the AND 152 serves to index the port type counter 154. The port type counter counts from 0 through 13 and then resets to zero, indexing every time the AND gate 152 issues a signal. When reset, the port type counter 154 is at its zero position and each time a signal is issued from the AND gate 152, the port type counter 154 outputs an enabling signal on a consecutive one of its outputs starting with output number 1 and progressing with each indexing signal up to output number 13. Each numbered output corresponds to the port type labeled in FIG. 18. High speed data ports corresponds to position 1, deferred data ports which are no longer deferrable, namely the 19.2K, 9.6K, 4.8K and 2.4K data ports correspond to outputs 2 through 5, respectively. Voice port sublevels 0, 1, 2 and 3 correspond respectively to outputs 6 through 9. And deferred data ports which are still deferrable, namely 19.2K, 9.6K, 4.8K and 2.4K data ports correspond respectively to outputs numbered 10 through 13, respectively.

Since high speed data ports always have their TBB partitions burst first in a frame, output 1 of the port type counter 154 corresponds to high speed data port partitions and when an enabling signal occurs at output 1 of the port data counter 154, the high speed data address for the fixed location initial pointer area 101a of the burst priority RAM 100 is issued from the fixed location address store 162 and is loaded into the initial pointer address register 108. Since the value of the byte scan count 77 is zero, the byte scan decoder 150 issues an enabling signal to the AND gate 168 whose other input is connected to the output of the fixed location address store 162. Thus, when the high speed data address for the fixed location initial pointer area is issued from the fixed location address store 162, it enables the AND gate 168 which issues a read enable signal on line 172 to the burst priority RAM 100 so that the fixed location initial pointer area 101a where the initial pointer for the high speed data list is stored will be accessed by the address stored in the initial pointer address register 108. During this period, the enabling signal from the AND gate 168 is also passed through the delay 170 and issues from the delay 170 to the FIFO write address counter 174 after a period of time necessary for the read operation to be completed to the fixed location initial pointer area 101a. The FIFO write address counter 174 is a simple counter which outputs consecutive write addresses to the initial pointer address register 108 which will access consecutive locations in the burst ordered initial pointer area 101b. Later, when the initial pointers for the respective lists are to be read out during bursting to the satellite, the FIFO read address counter 178 will output the same consecutive addresses to the initial pointer address register 108 for the burst ordered initial pointer area 101b so that the initial pointers written into the burst ordered initial pointer area 101b by the FIFO write address counter 174, will be read from the burst ordered initial pointer area 101b in the same order by the FIFO read address counter 178.

Returning to the operation of reordering the high speed data initial pointer, the output from the FIFO write address counter 174 provides a write enable signal over line 136 to the burst priority RAM 100 so that the write address loaded into the initial pointer address register 108 will enable the TBB partition which is read from the fixed location initial pointer area 101a by the previously described access with the fixed location address store 162, will now be written into the first portion of the burst ordered initial pointer area 101b, as is shown in FIG. 19.

Eight microseconds later when the next modulo 14 slot count is decoded from the slot count decoder 114 to satisfy the AND gate 152, the port type counter 154 will have an enabling output at its output 2 corresponding to the 19.2K data port list. To illustrate the operation of changing the priority of the data port list, it can be assumed that a frame number is equal to two so that Table III requires that the 19.2K data ports whose TBB partitions have been deferred, must be burst and that their priorities must be increased. The contents of Table III, namely the correlation between frame count and which deferred data ports must be burst, is stored in the low speed data priority ROS 120, as was previously described. As is shown in FIG. 18, the outputs 2, 3, 4 and 5 from the port type counter 154 are input to the low speed data priority ROS 120, as is the frame count 91. If, as in the assumed case, one of the deferred data port types must have their corresponding TBB partitions burst during this frame, an enabling signal is output over line 182 from the low speed data priority ROS 120 to indicate the necessity to increase the priority of that deferred data port type list, that signal being input to each of the four AND gates 156 shown in FIG. 18. The other inputs to the AND gates 156 are the respective output signals from outputs 2, 3, 4 and 5 on the port type counter 154. In the presently assumed case, the 19.2K data port list must be burst during this frame and therefore the AND gate 156 connected to the second output of the port type counter 154 is satisfied and transmits a signal to the fixed location address store 162 to issue the 19.2K data port address for the fixed location initial pointer area 101a. This address is loaded into the initial pointer address register 108, in a manner similar to that previously described for the high speed data initial pointer address, and, since the byte scan value is zero, AND gate 168 is satisfied, issuing a read enable signal over line 152 to the burst priority RAM 100 so that the initial pointer for the 19.2K data port list is read from the fixed location initial pointer area 101a. As was previously described, the signal output from the AND gate 168 also passes through the delay 170 and enables the FIFO write address counter 174 to issue the next consecutive write address for the burst ordered initial pointer area 101b. The write enable signal output on line 136 causes the TBB address for the 19.2K data list initial pointer which was read from the fixed location initial pointer area 101a, to be written into the second location in the burst ordered initial pointer area 101b, immediately following the initial pointer for the high speed data, as is shown in FIG. 19 for frame number 2, where the upgraded priority status of the initial pointer is indicated by a bar over its symbol $D_{19.2}$. In this manner, it can be seen that the relative position of the 19.2K data list in the TDMA burst to be transmitted from this earth station, has been moved from a deferred position which normally follows voice channels in the TDMA burst, to a higher priority position which immediately follows the high speed data channels in the TDMA burst.

Continuing with the assumed case that the frame number is equal to two, Table III and FIG. 19 show that none of the other low speed data port lists, namely 9.6K 4.8K or 2.4K need be altered from their relatively low, deferred priority status. Thus, as the port type counter 154 is incremented to output an enabling signal at its third output, since the low speed data priority ROS 120 does not indicate that it has become critical to increase the priority of the 9.6K data port lists, the AND gate 156 connected to the third output of the port type counter 154 is not satisfied. Thus no alteration is made in the relative position of the 9.6K data port lists in the TDMA burst. The port type counter 154 increments through the fourth and fifth positions in the same manner as it did through its third position since, for a frame number equal to two, the 9.6K, 4.8K and 2.4K data port lists may be deferred until after the voice channels have been transmitted.

When the port type counter 154 increments to output an enabling signal at its sixth output, it corresponds to the sublevel 0 voice port list which is the highest priority for voice ports and corresponds to all of those voice ports having talkspurts whose durations exceed 45 milliseconds. The enabling signal output from the sixth output of the port type counter 154 is directed to the fixed location address store 162 which issues the initial pointer address in the fixed location initial pointer area 101a wherein the sublevel 0 voice port initial pointer TBB partition address is stored. The sublevel 0 voice port initial pointer address is loaded into the initial pointer address register 108 and, since the scan value is zero, the AND gate 168 transmits a read enable signal over line 172 to the burst priority RAM so that the TBB partition address for the initial pointer for the sublevel 0 voice port list is read from the fixed location initial pointer area 101a. Since the 9.6K, 4.8K, and 2.4K data ports have been deferred, the next address to be issued by the FIFO write address counter 174 in response to the signal from the AND gate 168 corresponds to the third position in the burst ordered initial pointer area 101b, which follows the 19.2K data port initial pointer which was just written therein. The write enable signal output over line 136 from the FIFO write address counter 174 causes the initial pointer for the sublevel 0 voice port list which was read from the fixed location initial pointer area 101a, to be written into the third position in a burst ordered initial pointer area 101b, immediately following the 19.2K data port initial pointer, for frame number 2 as is shown in FIG. 19. The port type counter 154 continues to increment, loading the voice port sublevel 1, 2 and 3 initial pointers in the fourth, fifth and sixth positions respectively in the burst ordered initial pointer area 101b, as is shown in FIG. 19.

The port type counter 154 now increments to give an output signal at its 10th output position corresponding to the 19.2K data port list. Previously, when the port type counter 154 was at its second position and the 19.2K data ports were indicated by the low speed data priority ROS 120 to require an increase in priority, the signal output from the AND gate 156 connected to the output 2 of the port type counter 154 was also input to the flip-flop 158 connected thereto. This input signal to the flip-flop 158 interrupted an output signal to the AND gate 160 whose second inut is connected to the 10th output of the port type counter 154. Since the state of the flip-flop 158 is not reset until the port type counter 154 is reset to zero, the AND gate 160 connected to the 10th output of the port type counter 154 is not satisfied, and therefore no signal is transmitted at this juncture to the fixed location address store 162.

The port type counter 154 now increments so that an enabling signal is output from its 11th output corresponding to the 9.6 K data port list. Previously, when the port type counter 154 was in its third position corresponding to the 9.6 K data port lists, the low speed data priority ROS 120 indicated that there was no necessity to increase the priority of this class of deferred data ports and therefore the AND gate 156 connected to the third output of the port type counter 154 was not satisfied and thus the flip-flop 158 connected to the AND gate 156 having an input connected to the third output of the port type counter 154, was not previously signaled. Thus, that flip-flop is now delivering an enabling signal to the AND gate 160 whose other input is connected to the 11th output of the port type counter 154. Thus, the AND gate 160 having its input connected to the 11th output of the port type counter 154 is satisfied and transmits an enabling signal to the fixed location address store 162 which issues the 9.6 K data port list initial pointer address for the fixed location initial pointer area 101a. This address is loaded into the initial pointer address register 108 and a read enable signal is issued from the AND gate 168 over the line 172 to the burst priority RAM 100. In this manner, the TBB partition address for the last entry in the 9.6 K data port list is read from the fixed location initial pointer area 101a. As was described previously, the output of the AND gate 168 also causes the FIFO write address counter 174 to issue the next consecutive write address for the burst ordered initial pointer area 101b, into the initial pointer address register 108. The write enable signal over the line 136 to the burst priority RAM 100 then causes the 9.6 K data port contents read from the fixed location initial pointer area 101a to be written into the seventh position in the burst ordered initial pointer area 101b immediately following the lowest priority voice port list initial pointer. The port type counter 154 continues to increment through its 12th and 13th positions, causing the 4.8 K and 2.4 K data port list initial pointers to be loaded from the fixed location initial pointer area 101a into the eighth and ninth positions respectively of the burst ordered initial pointer area 101b. This concludes the burst reordering operation during the 0-th scan which required approximately 13×8 or 104 microseconds to complete, well within the allotted 125 microsecond time available for completion.

Now that the initial pointers have all been placed in the desired burst order in the burst ordered initial pointer area 101b of the burst priority RAM 100, the list stands ready to be transmitted when the assigned time for the commencement of the burst arrives. As was previously described, in preparation for traffic bursting, the burst prioritization mechanism 74 fetches the highest priority initial pointer from the burst ordered initial pointer list 101b and loads the pointer into the address register file 104. When the timing and acquisition mechanism 34 transmits a signal over line 138 requesting the burst of the first channel partition from the TBB 54, a read enable signal over line 172 causes the burst priority RAM 100 to issue the first TBB partition address in the high speed data port list and continues to issue read enable signals on line 172 whenever there is a request to transmit on line 138 and the slot count is equal to modulo 14. This corresponds to the location of the update slots in the SCM 50 as is seen in FIG. 6. When an entry accessed from the burst priority RAM 100 has the "last entry" bit on as is determined by line 180 from the RAM register file 122, the next request signal over line 138 then satisfies the AND gate 176 which issues an enabling signal to the FIFO read address counter 178. The read address counter 178 issues the next consecutive initial pointer address in the burst ordered initial pointer area 101b to the initial pointer address register 108. A read enable signal over line 172 will then cause the initial pointer for the 19.2 K data port list to be accessed from the burst ordered initial pointer area 101b and to be loaded into the RAM register file 122 and then into the address register 104. This initiates the bursting of the 19.2 K data port burst list. This operation continues until all of the initial pointer locations are accessed in the burst ordered initial pointer area 101b, thereby completing the bursting of all of the TBB partitions.

Thus it is seen that the burst prioritization mechanism 74 shown in FIG. 14 carries out the formation and transmission of burst lists for TBB channel partitions in the desired order of priority and it is further seen that the relative priority of the respective lists can be changed during the course of several frames when it becomes more urgently required that a particular category of ports 21 be burst to the satellite.

Although a specific embodiment of the invention has been disclosed it will be understood by those with skill in the art that the foregoing and other changes in form and details may be made therein without departing from the spirit and the scope of the invention.

Having thus described our invention, what we claim is new, and desire to secure by Letters Patent is:

1. In a TDMA communication system, a method for increasing transmission bandwidth, comprising the steps of:
 accumulating a first channel of data over a plurality of TDMA frames in a first buffer;
 transferring said first channel of accumulated data to a second buffer for transmission;
 accumulating a second channel of data in said first buffer;
 deferring the transmission of said first channel of data when the transmission of higher priority data leaves insufficient capacity for transmitting said first channel while accumulating said second channel;
 increasing the priority of said first channel of data above that for said higher priority data and transmitting said first channel when said accumulation of said second channel of data is completed.

2. In a TDMA communication system, an apparatus for increasing transmission bandwidth, comprising:
 a first buffer for accumulating a first channel of data over a plurality of TDMA frames;
 a second buffer connected to said first buffer, for storing said first channel of accumulated data for transmission;
 means for deferring the transmission of said first channel of data when the transmission of higher priority data leaves insufficient capacity for transmitting said first channel while accumulating a second channel of data in said first buffer;
 means for increasing the priority of said first channel of data above that for said higher priority data and transmitting said first channel when said accumulation of said second channel of data is completed.

3. In a TDMA communication system, each ground station having a plurality of digital ports connected to signal sources, divided into a first subplurality for transferring information having a relatively high priority and a second subplurality for transmitting information having a relatively lower priority, each station including a message memory for storing messages from said first and second subpluralities of ports, having addressable storage locations, and a threaded address memory for storing the addresses of the information stored in said message memory corresponding to said first and second subplurality of ports, respectively, means for changing the relative position of a message in a TMDA burst comprising:

means connected to one of said lower priority ports, for establishing the time of arrival of a terrestrial signal to said one port;

address storage means having outputs connected to said threaded address memory, for storing the addresses of messages in said message memory corresponding to all of said plurality of ports;

gating means connected between said address memory means and said threaded address memory, having a control input connected to said timing means, for storing the message address corresponding to one port in a first list in said threaded address memory, during a first TDMA frame so that the message originating from said one port occupies a later portion of the TDMA burst therein;

said gating means storing said message address corresponding to said one port in a second list in said threaded address memory during a later TDMA frame in response to said timing means, to effectively confer a higher priority to said message so that it occurs in an earlier portion of said TDMA burst;

whereby said message has its priority increased as time passes so that its relative position in a TDMA burst becomes earlier in succeeding TDM frames, thereby reducing the probability of freeze-out.

4. The apparatus of claim 3 wherein said source is a low speed data source having a data rate less than the minimum effective TDMA data rate so that components of said message may be buffered and their transmission deferred until transmission capacity is available or until said timing means increases the effective priority of said message.

5. In a TDMA communications network, a TMDA burst channel priority changing mechanism, comprising:

a fixed location initial pointer memory for storing in a fixed order the heads of threaded lists of port types, each port type having a different priority for transmission;

a burst ordered initial pointer memory for storing said heads of said threaded lists in a desired order for TDMA bursting;

a port type indicating counter, having a first input connected to a timing mechanism, having a first plurality of outputs for sequentially outputting enabling signals in a predetermined order of priority and a second plurality of outputs for outputting enabling signals in said predetermined order of priority, said first plurality of outputs transmitting enabling pulses before said second plurality of outputs as said timing mechanism inputs sequential signals to said counter;

a low speed data priority ROS having first inputs connected to said first outputs of said counter and a second input connected to a TDMA frame counting timer, for storing the pattern of correlation between low speed data port types whose transmission can be deferred and the TDMA frame count, and an output for transmitting an enabling signal when the last frame count is input for which a low speed data port type corresponding to one of said first inputs can be transmitted;

a fixed location address store having inputs gatably connected to said first plurality of outputs from said counter under control of said output from said low speed data priority ROS and an output connected as the address input to said fixed location initial pointer memory, for accessing locations in said fixed location initial pointer memory in response to one of said first plurality of outputs from said counter being gatably connected by said low speed data priority ROS to said fixed location address stores;

a write address counter connected to the output of said fixed location address store, for accessing a first position in said burst ordered initial pointer area to enable the transfer of said accessed initial pointer in said fixed location initial pointer area to said first position in said burst ordered initial pointer area accessed by said write address counter;

each of said second outputs of said port type counter being gatably connected to corresponding inputs of said fixed location address store under control of inhibiting means connected to said low speed data priority ROS output; whereby said heads of threaded lists for said low speed data port types whose last frame for transmission has been detected, are burst before other low speed data port types.

6. In a satellite communication system including a plurality of ground stations which intercommunicate in TDMA mode via a satellite transponder, each ground station having a radio frequency burst modem for transmitting a time divided sequence of information channels during an assigned burst period of a TDMA frame, each ground station having a plurality of digital ports connected to terrestrial signal sources, divided into a first subplurality for transferring information having a relatively high priority and a second subplurality for transmitting information having a relatively lower priority, each station including a message memory for storing messages from said first and second subpluralities of ports, having addressable storage locations, and a threaded address memory for storing the addresses of the information stored in said message memory corresponding to said first and second subplurality of ports, respectively, said burst period duration being assigned based on a statistical assessment of demand at each ground station, means for changing the relative position of a message in said TDMA burst at a given station, comprising:

means connected to one of said lower priority ports, for establishing the time of arrival of a terrestrial signal to said one port;

address storage means having outputs connected to said threaded address memory, for storing the addresses of messages in said message memory corresponding to all of said plurality of ports;

gating means connected between said address memory means and said threaded address memory, having a control input connected to said timing means, for storing the message address corresponding to one port in a first list in said threaded address memory, during a first TDMA frame so that the message originating from said one port occupies a later portion of the TDMA burst therein;

said gating means storing said message address corresponding to said one port in a second list in said threaded address memory during a later TDMA frame in response to said timing means, to effectively confer at a higher priority to said message so that it occurs in an earlier portion of said TDMA burst;

whereby said message has its priority increased as time passes so that its relative position in a TDMA burst becomes earlier in succeeding TDMA frames, thereby reducing the probability of freezeout.

7. The apparatus of claim 6 wherein said terrestrial source is a low speed data source having a data rate less than the minimum effective data rate of said satellite link so that components of said message may be buffered and their transmission deferred until transmission capacity is available or until said timing means increases the effective priority of said messaage.

8. In a TDMA satellite communications network, a TDMA burst channel priority changing mechanism, comprising:

a fixed position initial pointer memory for storing in a fixed order the heads of threaded lists of port types, each port type having a different priority for transmission;

a burst ordered initial pointer memory for storing said heads of said threaded lists in a desired order for TDMA bursting;

a port type indicating means, having a first input connected to a timing mechanism, having a first plurality of outputs for sequentially outputting enabling signals in a predetermined order of priority and a second plurality of outputs for outputting enabling signals in said predetermined order of priority, said first plurality of outputs transmitting enabling pulses before said second plurality of outputs as said timing mechanism inputs sequential signals to said counter;

a low speed data priority ROS having first inputs connected to said first outputs of said counter and a second input connected to a TDMA frame counting timer, for storing the pattern of correlation between low speed data port types whose transmission can be deferred and the TDMA frame count, and an output for transmitting an enabling signal when the last frame count is input for which a low speed data port type corresponding to one of said first inputs can be transmitted.

a fixed location address store having inputs gatably connected to said first plurality of outputs from said counter under control of said output from said low speed data priority ROS and an output connected as the address input to said fixed location initial pointer memory, for accessing locations in said fixed location initial pointer memory in response to one of said first plurality of outputs from said counter being gatably connected by said low speed data priority ROS to said fixed location address store;

a write address counter connected to the output of said fixed location address store, for accessing a first position in said burst ordered initial pointer area to enable the transfer of said accessed initial pointer in said fixed location initial pointer area to said first position in said burst ordered initial pointer area accessed by said write address counter;

each of said second outputs of said port type counter being gatably connected to corresponding inputs of said fixed location address store under control of inhibiting means connected to said low speed data priority ROS output;

whereby said heads of threaded lists for said low speed data port types whose last frame for transmission has been detected, are burst before other low speed data port types.

* * * * *